United States Patent
Tanaka et al.

(10) Patent No.: US 11,960,722 B2
(45) Date of Patent: Apr. 16, 2024

(54) MEMORY DEVICE PROGRAMMING TECHNIQUE FOR INCREASED BITS PER CELL

(71) Applicant: MICRON TECHNOLOGY, INC., Boise, ID (US)

(72) Inventors: Tomoharu Tanaka, Yokohama (JP); Huai-Yuan Tseng, San Ramon, CA (US); Dung V. Nguyen, San Jose, CA (US); Kishore Kumar Muchherla, Fremont, CA (US); Eric N. Lee, San Jose, CA (US); Akira Goda, Tokyo (JP); James Fitzpatrick, Laguna Niguel, CA (US); Dave Ebsen, Minnetonka, MN (US)

(73) Assignee: Micron Technology, Inc., Boise, ID (US)

( * ) Notice: Subject to any disclaimer, the term of this patent is extended or adjusted under 35 U.S.C. 154(b) by 17 days.

(21) Appl. No.: 17/872,217

(22) Filed: Jul. 25, 2022

(65) Prior Publication Data

US 2024/0028200 A1    Jan. 25, 2024

(51) Int. Cl.
*G06F 3/06* (2006.01)

(52) U.S. Cl.
CPC ............ *G06F 3/0608* (2013.01); *G06F 3/064* (2013.01); *G06F 3/0679* (2013.01)

(58) Field of Classification Search
CPC ........ G06F 3/0652; G06F 3/06; G06F 3/0608; G06F 3/0638; G06F 3/064; G06F 3/0679; G06F 3/0607; G06F 3/0614
See application file for complete search history.

(56) References Cited

U.S. PATENT DOCUMENTS

| 10,373,697 B1 * | 8/2019 | Lai ....................... G11C 11/5635 |
| 11,556,479 B1 * | 1/2023 | He ....................... G06F 12/0893 |

(Continued)

FOREIGN PATENT DOCUMENTS

| WO | WO-2016118225 A1 * | 7/2016 | ......... G11C 11/5621 |
| WO | WO-2018187016 A1 * | 10/2018 | ......... G06F 12/0246 |

(Continued)

OTHER PUBLICATIONS

H. Lin, Y. Guo, Y. Xi, Y. Kong, X. Zhan and J. Chen, "Optimal Read Voltages of Retention-after-Cycling in Triple-level-cell (TLC) 3D NAND Flash Memory and its High-precision Modeling Method," 2022 IEEE Silicon Nanoelectronics Workshop (SNW), Honolulu, HI, USA, 2022, pp. 1-2.*

N. R. Mielke, R. E. Frickey, I. Kalastirsky, M. Quan, D. Ustinov and V. J. Vasudevan, "Reliability of Solid-State Drives Based on NAND Flash Memory," in Proceedings of the IEEE, vol. 105, No. 9, pp. 1725-1750, Sep. 2017.*

(Continued)

*Primary Examiner* — Pierre Michel Bataille
(74) *Attorney, Agent, or Firm* — Dicke, Billig & Czaja, PLLC

(57) ABSTRACT

A memory device includes an array of memory cells and a controller configured to access the array of memory cells. The controller is further configured to program a first number of bits to a first memory cell of the array of memory cells and program a second number of bits to a second memory cell of the array of memory cells. The controller is further configured to following a period after programming the second number of bits to the second memory cell, merge at least a subset of the first number of bits stored in the first memory cell to the second number of bits stored in the second memory cell without erasing the second memory cell such that the second number of bits plus at least the subset of the first number of bits are stored in the second memory cell.

20 Claims, 14 Drawing Sheets

(56) References Cited

U.S. PATENT DOCUMENTS

| | | | |
|---|---|---|---|
| 2020/0395087 A1* | 12/2020 | Banerjee | G11C 16/14 |
| 2021/0279180 A1* | 9/2021 | Um | G06F 12/10 |
| 2021/0349662 A1* | 11/2021 | Helm | G06F 3/0659 |
| 2022/0050627 A1* | 2/2022 | Pratt | G11C 16/10 |
| 2022/0336028 A1* | 10/2022 | Moschiano | G11C 16/30 |
| 2022/0343983 A1* | 10/2022 | Shin | G11C 16/0483 |
| 2023/0027384 A1* | 1/2023 | Tseng | G11C 11/5671 |
| 2023/0034752 A1* | 2/2023 | Ning | G11C 16/08 |

FOREIGN PATENT DOCUMENTS

| | | | | |
|---|---|---|---|---|
| WO | WO-2019221790 A1 * | 11/2019 | | G11C 11/5628 |
| WO | WO-2022039940 A1 * | 2/2022 | | G06F 3/0616 |

OTHER PUBLICATIONS

Y. Li, Q. Wang, X. Zhan, M. Jia, R. Cao and J. Chen, "A Novel quasi-SLC(qSLC) /Program/Erase Scheme in Ultra-Densified Charge-trapping 3D Nand Flash Memory to Enhance System Level Performance," 2020 IEEE Silicon Nanoelectronics Workshop (SNW), Honolulu, HI, USA, 2020, pp. 45-46.*

M. Ye, Q. Li, J. Nie, T.-W. Kuo and C. J. Xue, "Valid Window: A New Metric to Measure the Reliability of NAND Flash Memory," 2020 Design, Automation & Test in Europe Conference & Exhibition (DATE), Grenoble, France, 2020, pp. 109-114.*

Joe Brewer; Manzur Gill, "NAND Flash Memory Technology," in Nonvolatile Memory Technologies with Emphasis on Flash: A Comprehensive Guide to Understanding and Using Flash Memory Devices , IEEE, 2008, pp. 223-311.*

* cited by examiner

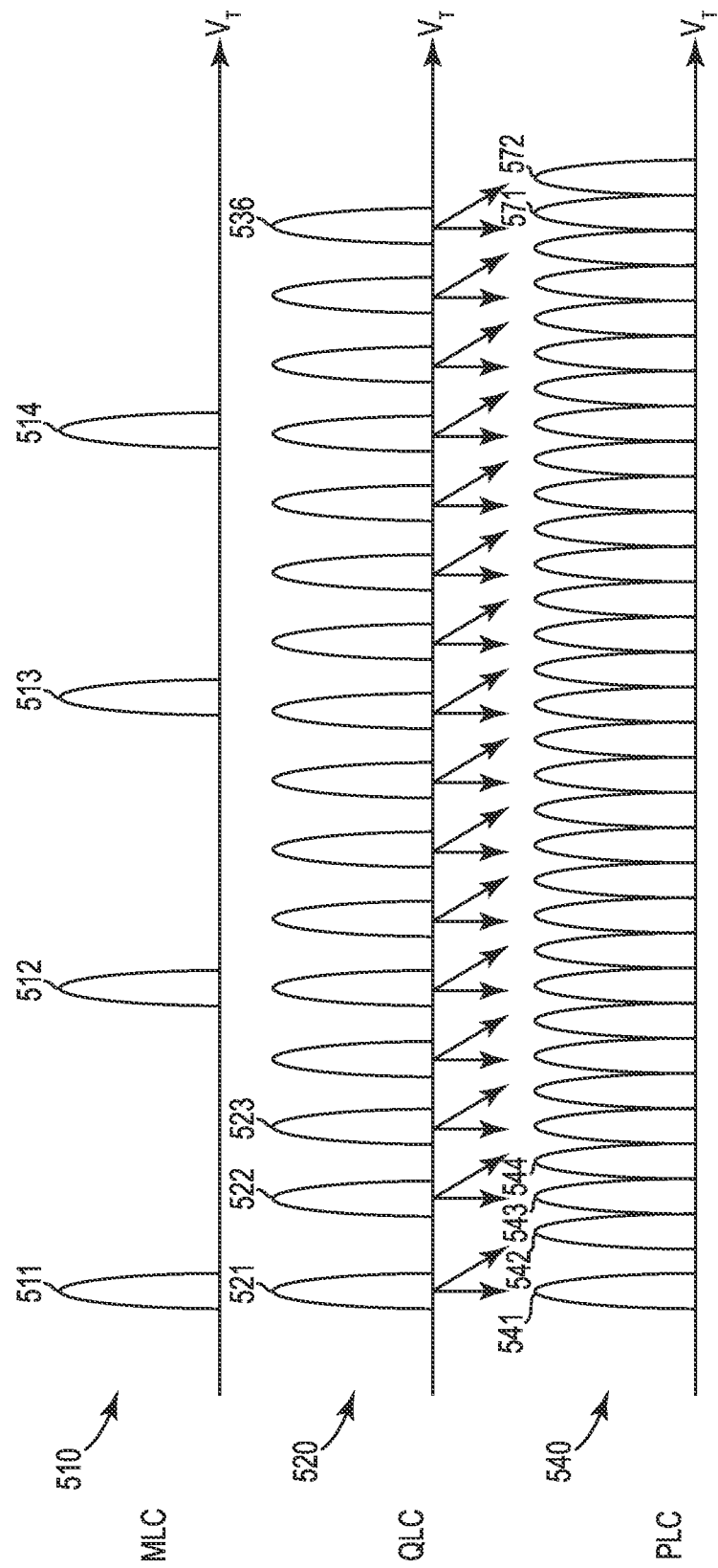

MEMORY DEVICE PROGRAMMING TECHNIQUE FOR INCREASED BITS PER CELL

RELATED APPLICATIONS

This application is related to U.S. patent application Ser. No. 17/872,426 filed Jul. 25, 2022 titled "QUICK CHARGE LOSS MITIGATION USING TWO-PASS CONTROLLED DELAY" and filed even date herewith, each such application being commonly assigned and incorporated by reference in its entirety.

TECHNICAL FIELD

The present disclosure relates generally to memory and, in particular, in one or more embodiments, the present disclosure relates to programming operations within memory devices to increase the number of bits per memory cell.

BACKGROUND

Memories (e.g., memory devices) are typically provided as internal, semiconductor, integrated circuit devices in computers or other electronic devices. There are many different types of memory including random-access memory (RAM), read only memory (ROM), dynamic random access memory (DRAM), synchronous dynamic random access memory (SDRAM), and flash memory.

Flash memory has developed into a popular source of non-volatile memory for a wide range of electronic applications. Flash memory typically use a one-transistor memory cell that allows for high memory densities, high reliability, and low power consumption. Changes in threshold voltage (Vt) of the memory cells, through programming (which is often referred to as writing) of charge storage structures (e.g., floating gates or charge traps) or other physical phenomena (e.g., phase change or polarization), determine the data state (e.g., data value) of each memory cell. Common uses for flash memory and other non-volatile memory include personal computers, personal digital assistants (PDAs), digital cameras, digital media players, digital recorders, games, appliances, vehicles, wireless devices, mobile telephones, and removable memory modules, and the uses for non-volatile memory continue to expand.

A NAND flash memory is a common type of flash memory device, so called for the logical form in which the basic memory cell configuration is arranged. Typically, the array of memory cells for NAND flash memory is arranged such that the control gate of each memory cell of a row of the array is connected together to form an access line, such as a word line. Columns of the array include strings (often termed NAND strings) of memory cells connected together in series between a pair of select gates, e.g., a source select transistor and a drain select transistor. Each source select transistor may be connected to a source, while each drain select transistor may be connected to a data line, such as column bit line. Variations using more than one select gate between a string of memory cells and the source, and/or between the string of memory cells and the data line, are known.

In programming memory, memory cells may generally be programmed as what are often termed single-level cells (SLC) or multiple-level cells (MLC). SLC may use a single memory cell to represent one digit (e.g., bit) of data. For example, in SLC, a Vt of 2.5V might indicate a programmed memory cell (e.g., representing a logical 0) while a Vt of −0.5V might indicate an erased cell (e.g., representing a logical 1). As an example, the erased state in SLC might be represented by any threshold voltage less than or equal to 0V, while the programmed data state might be represented by any threshold voltage greater than 0V.

MLC uses more than two Vt ranges, where each Vt range indicates a different data state. As is generally known, a margin (e.g., a certain number of volts), such as a dead space, may separate adjacent Vt ranges, e.g., to facilitate differentiating between data states. Multiple-level cells can take advantage of the analog nature of traditional non-volatile memory cells by assigning a bit pattern to a specific Vt range. While MLC typically uses a memory cell to represent one data state of a binary number of data states (e.g., 4, 8, 16, ... ), a memory cell operated as MLC may be used to represent a non-binary number of data states. For example, where the MLC uses three Vt ranges, two memory cells might be used to collectively represent one of eight data states.

In programming MLC memory, data values are often programmed using more than one pass, e.g., programming one or more digits in each pass. For example, in four-level MLC (typically referred to simply as multi-level cell [MLC]), a first digit, e.g., a least significant bit (LSB), often referred to as lower page (LP) data, may be programmed to the memory cells in a first pass, thus resulting in two (e.g., first and second) threshold voltage ranges. Subsequently, a second digit, e.g., a most significant bit (MSB), often referred to as upper page (UP) data may be programmed to the memory cells in a second pass, typically moving some portion of those memory cells in the first threshold voltage range into a third threshold voltage range, and moving some portion of those memory cells in the second threshold voltage range into a fourth threshold voltage range. Similarly, eight-level MLC (typically referred to as triple-level cell [TLC]) may represent a bit pattern of three bits, including a first digit, e.g., a least significant bit (LSB) or lower page (LP) data; a second digit, e.g., upper page (UP) data; and a third digit, e.g., a most significant bit (MSB) or extra page (XP) data. In operating TLC, the LP data may be programmed to the memory cells in a first pass, resulting in two threshold voltage ranges, followed by the UP data and the XP data in a second pass, resulting in eight threshold voltage ranges. Similarly, 16-level MLC (typically referred to as quad-level cell [QLC]) may represent a bit pattern of four bits, and 32-level MLC (typically referred to as penta-level cell [PLC]) may represent a bit pattern of five bits.

A read window, which may be referred to as a read window width, refers to a distance (e.g., in voltage) between adjacent Vt distributions (e.g., ranges) at a particular bit error rate (BER). A read window budget (RWB) may refer to a cumulative value of read windows for a group of programmed cells (e.g., one or more pages of cells). For example, TLC memory cells configured to store three bits of data per cell may be programmed to one of eight different Vt distributions, each corresponding to a respective data state. In this example, the RWB may be the cumulative value (e.g., in voltage) of the seven read windows between the eight Vt distributions.

Recognizing that errors might occur in reading of data from the memory device, one or more types of error correction methods might be employed. Error Correction Schemes, commonly referred to as error correction codes (ECC), can be implemented to detect and attempt to correct these errors. Various ECCs include codes in which each data signal subjected to the ECC should conform to the specific rules of construction of the ECC. Departures from this construction of data (e.g., errors) that are not too great can generally be automatically detected and sometimes corrected. Examples of ECCs include Hamming code, BCH code, Reed-Solomon code, Reed-Muller code, Binary Golay code, Low-Density Parity Code, and Trellis Code modulation. Some ECCs can correct single-bit errors and detect double-bit errors. Other ECCs can detect and/or correct multi-bit errors, for example.

Typically, a memory device will store data (e.g., user data) at a first location in memory and associated error correction code (ECC) data at a second memory location in the memory device. During a read operation, the stored user data and the ECC data are read from the memory array in response to a read request of the user data. Using known algorithms, the user data returned from the read operation is compared to the ECC data. If errors are detected and those errors are within the limits of the ECC, e.g., sufficient ECC resolution exists in the stored ECC data, the errors may be corrected. Such use of ECC for the detection and correction of bit errors is well understood in the art.

BRIEF DESCRIPTION OF THE DRAWINGS

FIG. 5B depicts the merging of a MLC block of memory cells with a QLC block of memory cells to provide a PLC block of memory cells, according to an embodiment.

DETAILED DESCRIPTION

Figure 1:
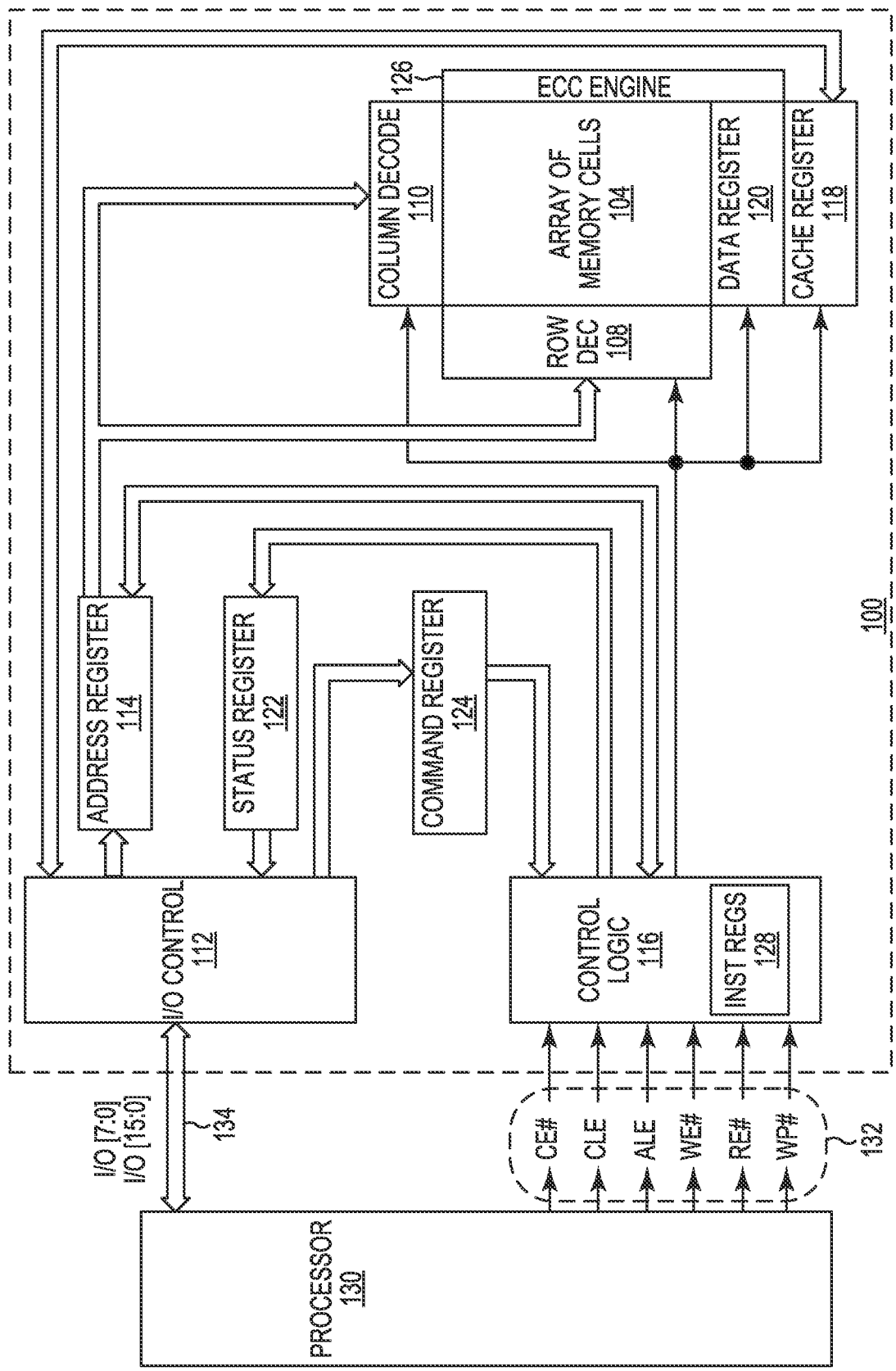
FIG. 1 is a simplified block diagram of a memory in communication with a processor as part of an electronic system, according to an embodiment.

In the following detailed description, reference is made to the accompanying drawings that form a part hereof, and in which is shown, by way of illustration, specific embodiments. In the drawings, like reference numerals describe substantially similar components throughout the several views. Other embodiments may be utilized and structural, logical and electrical changes may be made without departing from the scope of the present disclosure. The following detailed description is, therefore, not to be taken in a limiting sense.

The term "semiconductor" used herein can refer to, for example, a layer of material, a wafer, or a substrate, and includes any base semiconductor structure. "Semiconductor" is to be understood as including silicon-on-sapphire (SOS) technology, silicon-on-insulator (SOI) technology, thin film transistor (TFT) technology, doped and undoped semiconductors, epitaxial layers of a silicon supported by a base semiconductor structure, as well as other semiconductor structures well known to one skilled in the art. Furthermore, when reference is made to a semiconductor in the following description, previous process steps might have been utilized to form regions/junctions in the base semiconductor structure, and the term semiconductor can include the underlying layers containing such regions/junctions.

The term "conductive" as used herein, as well as its various related forms, e.g., conduct, conductively, conducting, conduction, conductivity, etc., refers to electrically conductive unless otherwise apparent from the context. Similarly, the term "connecting" as used herein, as well as its various related forms, e.g., connect, connected, connection, etc., refers to electrically connecting unless otherwise apparent from the context.

It is recognized herein that even where values might be intended to be equal, variabilities and accuracies of industrial processing and operation might lead to differences from their intended values. These variabilities and accuracies will generally be dependent upon the technology utilized in fabrication and operation of the integrated circuit device. As such, if values are intended to be equal, those values are deemed to be equal regardless of their resulting values.

FIG. 1 is a simplified block diagram of a first apparatus, in the form of a memory (e.g., memory device) 100, in communication with a second apparatus, in the form of a processor 130, as part of a third apparatus, in the form of an electronic system, according to an embodiment. Some examples of electronic systems include personal computers, personal digital assistants (PDAs), digital cameras, digital media players, digital recorders, games, appliances, vehicles, wireless devices, mobile telephones and the like. The processor 130, e.g., a controller external to the memory device 100, might be a memory controller or other external host device.

Memory device 100 includes an array of memory cells 104 that might be logically arranged in rows and columns. Memory cells of a logical row are typically connected to the same access line (commonly referred to as a word line) while memory cells of a logical column are typically selectively connected to the same data line (commonly referred to as a bit line). A single access line might be associated with more than one logical row of memory cells and a single data line might be associated with more than one logical column. Memory cells (not shown in FIG. 1) of at least a portion of array of memory cells 104 are capable of being programmed to one of at least two target data states.

A row decode circuitry 108 and a column decode circuitry 110 are provided to decode address signals. Address signals are received and decoded to access the array of memory cells 104. Memory device 100 also includes input/output (I/O) control circuitry 112 to manage input of commands, addresses and data to the memory device 100 as well as output of data and status information from the memory device 100. An address register 114 is in communication with I/O control circuitry 112 and row decode circuitry 108 and column decode circuitry 110 to latch the address signals prior to decoding. A command register 124 is in communication with I/O control circuitry 112 and control logic 116 to latch incoming commands.

A controller (e.g., the control logic 116 internal to the memory device 100) controls access to the array of memory cells 104 in response to the commands and may generate status information for the external processor 130, i.e., control logic 116 is configured to perform access operations (e.g., sensing operations [which might include read operations and verify operations], programming operations and/or erase operations) on the array of memory cells 104. The control logic 116 is in communication with row decode circuitry 108 and column decode circuitry 110 to control the row decode circuitry 108 and column decode circuitry 110 in response to the addresses. The control logic 116 might include instruction registers 128 which might represent computer-usable memory for storing computer-readable instructions. For some embodiments, the instruction registers 128 might represent firmware. Alternatively, the instruction registers 128 might represent a grouping of memory cells, e.g., reserved block(s) of memory cells, of the array of memory cells 104.

Control logic 116 might also be in communication with a cache register 118. Cache register 118 latches data, either incoming or outgoing, as directed by control logic 116 to temporarily store data while the array of memory cells 104 is busy writing or reading, respectively, other data. During a programming operation (e.g., write operation), data might be passed from the cache register 118 to the data register 120 for transfer to the array of memory cells 104; then new data might be latched in the cache register 118 from the I/O control circuitry 112. During a read operation, data might be passed from the cache register 118 to the I/O control circuitry 112 for output to the external processor 130; then new data might be passed from the data register 120 to the cache register 118. The cache register 118 and/or the data register 120 might form (e.g., might form a portion of) a page buffer of the memory device 100. A page buffer might further include sensing devices (not shown in FIG. 1) to sense a data state of a memory cell of the array of memory cells 104, e.g., by sensing a state of a data line connected to that memory cell. A status register 122 might be in communication with I/O control circuitry 112 and control logic 116 to latch the status information for output to the processor 130.

Memory device 100 receives control signals at control logic 116 from processor 130 over a control link 132. The control signals might include a chip enable CE #, a command latch enable CLE, an address latch enable ALE, a write enable WE #, a read enable RE #, and a write protect WP #. Additional or alternative control signals (not shown) might be further received over control link 132 depending upon the nature of the memory device 100. Memory device 100 receives command signals (which represent commands), address signals (which represent addresses), and data signals (which represent data) from processor 130 over a multiplexed input/output (I/O) bus 134 and outputs data to processor 130 over I/O bus 134.

For example, the commands might be received over input/output (I/O) pins [7:0] of I/O bus 134 at I/O control circuitry 112 and might then be written into command register 124. The addresses might be received over input/output (I/O) pins [7:0] of I/O bus 134 at I/O control circuitry 112 and might then be written into address register 114. The data might be received over input/output (I/O) pins [7:0] for an 8-bit device or input/output (I/O) pins [15:0] for a 16-bit device at I/O control circuitry 112 and then might be written into cache register 118. The data might be subsequently written into data register 120 for programming the array of memory cells 104. For another embodiment, cache register 118 might be omitted, and the data might be written directly into data register 120. Data might also be output over input/output (I/O) pins [7:0] for an 8-bit device or input/output (I/O) pins [15:0] for a 16-bit device. Although reference might be made to I/O pins, they might include any conductive nodes providing for electrical connection to the memory device 100 by an external device (e.g., processor 130), such as conductive pads or conductive bumps as are commonly used.

Control logic 116 might also be in communication with an error correction code (ECC) engine 126. According to various embodiments, control logic 116 is configured to support ECC operations performed internally to the memory device 100 by the ECC engine 126. For example, the ECC engine 126 might be activated or deactivated by the control logic 116. The control logic 116 and the ECC engine 126, with or without additional circuitry or firmware, may be considered portions of an internal controller. The ECC engine 126 of memory device 100 is configured to perform various ECC operations internally to the memory device independent of support or instruction from the processor 130 according to various embodiments of the present disclosure. For example, the ECC engine 126 might be configured to support one or more ECC schemes such as Hamming code, BCH code, Reed-Solomon code, Reed-Muller code, Binary Golay code, Low-Density Parity Code, and Trellis Code modulation methods and algorithms. Selection of which methodology to implement in the ECC engine 126 might be tailored to the technology and/or a desired target reliability level, for example. According to various embodiments, the ECC engine 126 might be configured to facilitate performing an ECC operation on a variety of groupings of memory cells, such as a page and/or a block of memory cells, for example.

ECC engine 126 might be activated or deactivated by control logic 116. ECC engine 126 is configured to facilitate generating ECC data corresponding to user data to be stored in and/or to be read from the array of memory cells 104. For example, user data to be stored (e.g., programmed) in the array of memory cells 104 might pass through the ECC engine 126 wherein the ECC engine generates corresponding ECC data to be stored along with the user data. As part of a read operation, user data along with its corresponding stored ECC data might be read from a location in the array of memory cells 104. The ECC engine 126 is further configured to generate additional ECC data (e.g., ECC test data) corresponding to the user data which was read from the memory location. The ECC engine 126 compares the generated ECC test data with the ECC data stored with the user data when it was stored in the array of memory cells 104. If the generated ECC test data and the ECC data read from the array of memory cells 104 match, then it is assumed that there are no errors in the user data that was read from the array of memory cells. If a mismatch of the generated ECC test data and the read ECC data occurs, an error is assumed to be present in the user data read from the array of memory cells 104.

The ECC engine 126 is further configured to perform various ECC algorithms in an attempt to correct an error detected in the user data read from the array of memory cells 104. According to one or more embodiments, corrected user data might then be stored back in the array of memory cells 104 as facilitated by the internal controller (e.g., ECC engine 126 and/or control logic 116). Thus, the memory device 100 is configured with a 'loop back path' to store corrected data (e.g., corrected user data) back to the array from which the corrupted data was read. The ECC engine 126 according to various embodiments of the present disclosure facilitates performing various ECC operations internally to the memory device 100 and absent any direction from an external processor 130, for example. The success of correcting an error can depend on a number of factors. Some errors might not be correctable depending on the type and strength of the ECC algorithms employed by the ECC engine 126.

ECC engine 126 may further be configured to perform various ECC operations in response to various conditions for initiating (e.g., independently initiating) internal ECC operations in the memory device 100. Performing the ECC operation might be facilitated by an internal controller of the memory device, e.g., by control logic 116 and/or ECC engine 126. A decision to initiate an ECC operation might be made by various methods. An internal ECC operation might be initiated responsive to an instruction received from an external processor 130. Internal ECC operations might be initiated and performed as background operations in the memory device, such as in the absence of an instruction from an external processor 130 to perform an internal ECC operation according to one or more embodiments of the present disclosure.

By way of example, an internal ECC operation according to various embodiments might be initiated by one or both of the ECC engine 126 and control logic 116. Internal ECC operations might be performed periodically. For example, ECC operations might be performed responsive to a particular time that has elapsed, such as elapsed time since previously performing internal ECC operations according to various embodiments of the present disclosure. Following the initiation of an ECC operation, memory cells selected to be checked are read from the array of memory cells 104 to obtain read user data and corresponding read ECC data. The ECC engine 126 processes the read user data and the read ECC data by applying a particular ECC algorithm to the read user data. The ECC engine 126 applies the ECC algorithm to the read user data to generate ECC data (e.g., ECC test data) corresponding to the read user data. The ECC test data is compared to the ECC data read from the memory device and corresponding to the read user data. A determination is made if an error exists in the read user data responsive to a result of the comparison of the ECC test data and the read ECC data. The ECC operation is concluded if no error is detected. The determination of whether an error exists may include measuring a raw bit error rate (RBER) indicating the extent of the errors. In some embodiments, the measured RBER may be compared to a threshold RBER that is correctable by the ECC engine 126. If the measured RBER is equal to or greater than the threshold RBER, the ECC engine 126 might correct the errors or attempt to correct the errors. If the measured RBER is less than the threshold RBER, the ECC engine 126 might delay attempting to correct the errors until the measured RBER is greater than or equal to the threshold RBER. By delaying the attempt to correct the errors, quality of service (QoS) of the memory device might be improved by reducing the frequency of ECC operations.

A result of the ECC compare operation might indicate that an error exists in the read user data. When an error is indicated, an attempt to identify memory cells contributing to the error (e.g., storing corrupted data) might be made. If the errors are within the limits of the ECC, and correction is possible, identification of memory cells contributing to the error is a straightforward task, i.e., those memory cells corresponding to read data to be corrected. According to one or more embodiments, the ECC engine 126 is further configured to determine if the cause of the detected error was due to threshold voltage drift in one or more memory cells, such as having a threshold voltage which has drifted to a lower level. If the errors are within the limits of the ECC, and correction is possible, determination of the cause of the detected error is a straightforward task. For example, if the ECC test data were to indicate that data corresponding to a memory cell should represent a higher data state, but the read user data corresponding to that memory cell represented a lower data state, the cause of the error could be deemed to be the result of a decrease in threshold voltage of that memory cell.

If one or more memory cells are identified as having a reduced threshold voltage, the ECC engine 126 and/or the control logic 116, might facilitate performing a programming operation on the identified memory cells (e.g., touch up programming operation) to increase their threshold voltage levels to restore them to their pre-threshold voltage drift levels. In other words, the touch up programming operation facilitates restoring an amount of charge (e.g., such as without first performing an erase operation) to the charge storage structures of the memory cells such that their threshold voltages again have a level corresponding to their intended (e.g., desired) programmed levels. A verify operation might be performed along with the touch up programming operation to verify that the desired threshold voltage levels for the memory cells have been restored. Thus, according to various embodiments of the present disclosure, a programming operation (e.g., touch up programming operation) is performed on memory cells identified as experiencing reduction in threshold voltage levels responsive to performing an ECC operation.

It will be appreciated by those skilled in the art that additional circuitry and signals can be provided, and that the memory device 100 of FIG. 1 has been simplified. It should be recognized that the functionality of the various block components described with reference to FIG. 1 might not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Additionally, while specific I/O pins are described in accordance with popular conventions for receipt and output of the various signals, it is noted that other combinations or numbers of I/O pins (or other I/O node structures) might be used in the various embodiments.

Figure 2A:
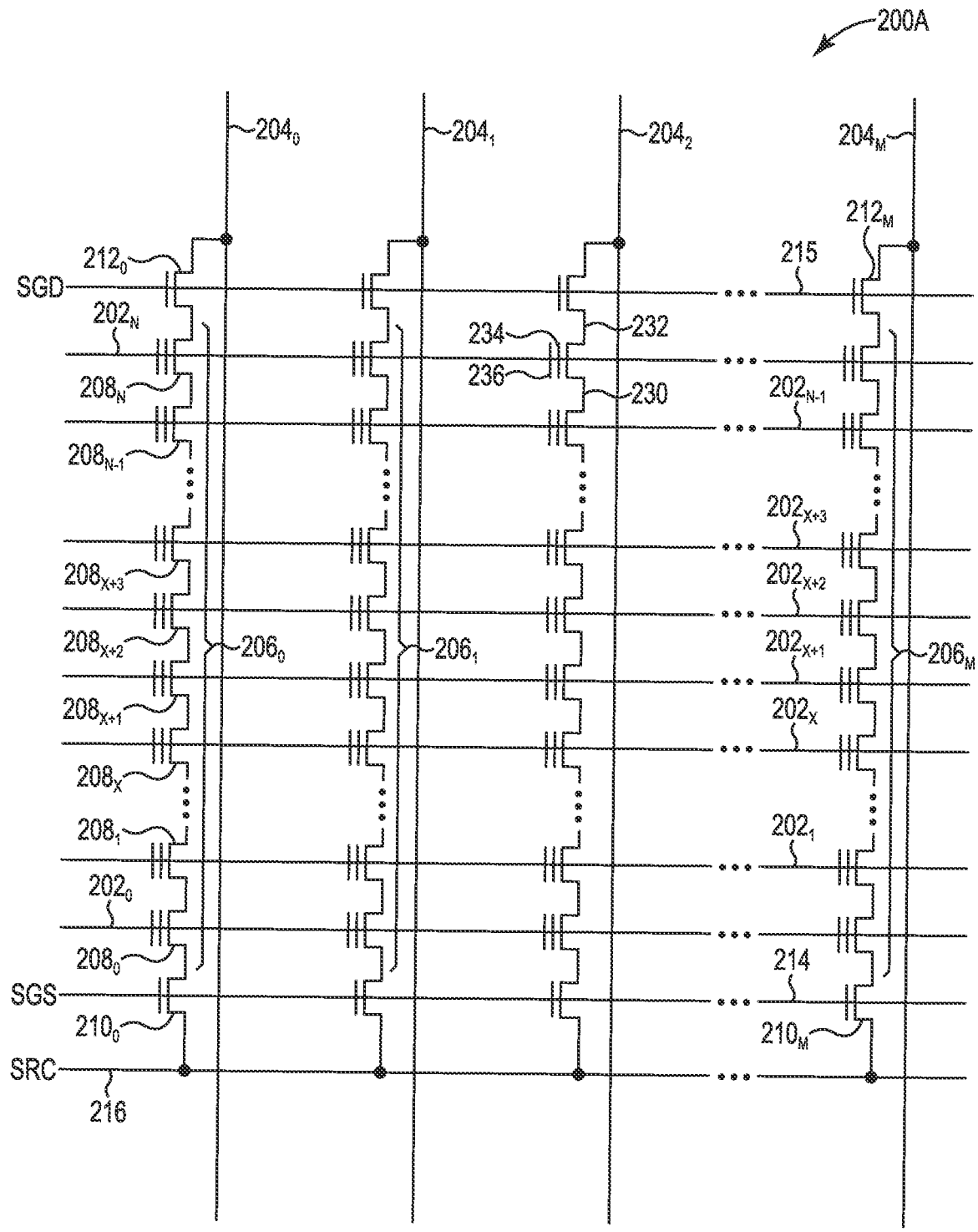
FIGS. 2A-2C are schematics of portions of an array of memory cells as could be used in a memory of the type described with reference to FIG. 1.

FIG. 2A is a schematic of a portion of an array of memory cells 200A, such as a NAND memory array, as could be used in a memory of the type described with reference to FIG. 1, e.g., as a portion of array of memory cells 104. Memory array 200A includes access lines (e.g., word lines) $202_0$ to $202_N$, and data lines (e.g., bit lines) $204_0$ to $204_M$. The access lines 202 might be connected to global access lines (e.g., global word lines), not shown in FIG. 2A, in a many-to-one relationship. For some embodiments, memory array 200A might be formed over a semiconductor that, for example, might be conductively doped to have a conductivity type, such as a p-type conductivity, e.g., to form a p-well, or an n-type conductivity, e.g., to form an n-well.

Memory array 200A might be arranged in rows (each corresponding to an access line 202) and columns (each corresponding to a data line 204). Each column might include a string of series-connected memory cells (e.g., non-volatile memory cells), such as one of NAND strings $206_0$ to $206_M$. Each NAND string 206 might be connected (e.g., selectively connected) to a common source (SRC) 216 and might include memory cells $208_0$ to $208_N$. The memory cells 208 might represent non-volatile memory cells for storage of data. The memory cells $208_0$ to $208_N$ might include memory cells intended for storage of data, and might further include other memory cells not intended for storage of data, e.g., dummy memory cells. Dummy memory cells are typically not accessible to a user of the memory, and are instead typically incorporated into the string of series-connected memory cells for operational advantages that are well understood.

The memory cells 208 of each NAND string 206 might be connected in series between a select gate 210 (e.g., a field-effect transistor), such as one of the select gates $210_0$ to $210_M$ (e.g., that might be source select transistors, commonly referred to as select gate source), and a select gate 212 (e.g., a field-effect transistor), such as one of the select gates $212_0$ to $212_M$ (e.g., that might be drain select transistors, commonly referred to as select gate drain). Select gates $210_0$ to $210_M$ might be commonly connected to a select line 214, such as a source select line (SGS), and select gates $212_0$ to $212_M$ might be commonly connected to a select line 215, such as a drain select line (SGD). Although depicted as traditional field-effect transistors, the select gates 210 and 212 might utilize a structure similar to (e.g., the same as) the memory cells 208. The select gates 210 and 212 might represent a plurality of select gates connected in series, with each select gate in series configured to receive a same or independent control signal.

A source of each select gate 210 might be connected to common source 216. The drain of each select gate 210 might be connected to a memory cell $208_0$ of the corresponding NAND string 206. For example, the drain of select gate $210_0$ might be connected to memory cell $208_0$ of the corresponding NAND string $206_0$. Therefore, each select gate 210 might be configured to selectively connect a corresponding NAND string 206 to common source 216. A control gate of each select gate 210 might be connected to select line 214.

The drain of each select gate 212 might be connected to the data line 204 for the corresponding NAND string 206. For example, the drain of select gate $212_0$ might be connected to the data line $204_0$ for the corresponding NAND string $206_0$. The source of each select gate 212 might be connected to a memory cell $208_N$ of the corresponding NAND string 206. For example, the source of select gate $212_0$ might be connected to memory cell $208_N$ of the corresponding NAND string $206_0$. Therefore, each select gate 212 might be configured to selectively connect a corresponding NAND string 206 to the corresponding data line 204. A control gate of each select gate 212 might be connected to select line 215.

The memory array in FIG. 2A might be a quasi-two-dimensional memory array and might have a generally planar structure, e.g., where the common source 216, NAND strings 206 and data lines 204 extend in substantially parallel planes. Alternatively, the memory array in FIG. 2A might be a three-dimensional memory array, e.g., where NAND strings 206 might extend substantially perpendicular to a plane containing the common source 216 and to a plane containing the data lines 204 that might be substantially parallel to the plane containing the common source 216.

Typical construction of memory cells 208 includes a data-storage structure 234 (e.g., a floating gate, charge trap, or other structure configured to store charge) that can determine a data state of the memory cell (e.g., through changes in threshold voltage), and a control gate 236, as shown in FIG. 2A. The data-storage structure 234 might include both conductive and dielectric structures while the control gate 236 is generally formed of one or more conductive materials. In some cases, memory cells 208 might further have a defined source/drain (e.g., source) 230 and a defined source/drain (e.g., drain) 232. Memory cells 208 have their control gates 236 connected to (and in some cases form) an access line 202.

A column of the memory cells 208 might be a NAND string 206 or a plurality of NAND strings 206 selectively connected to a given data line 204. A row of the memory cells 208 might be memory cells 208 commonly connected to a given access line 202. A row of memory cells 208 can, but need not, include all memory cells 208 commonly connected to a given access line 202. Rows of memory cells 208 might often be divided into one or more groups of physical pages of memory cells 208, and physical pages of memory cells 208 often include every other memory cell 208 commonly connected to a given access line 202. For example, memory cells 208 commonly connected to access line $202_N$ and selectively connected to even data lines 204 (e.g., data lines $204_0$, $204_2$, $204_4$, etc.) might be one physical page of memory cells 208 (e.g., even memory cells) while memory cells 208 commonly connected to access line $202_N$ and selectively connected to odd data lines 204 (e.g., data lines $204_1$, $204_3$, $204_5$, etc.) might be another physical page of memory cells 208 (e.g., odd memory cells). Although data lines $204_3$-$204_5$ are not explicitly depicted in FIG. 2A, it is apparent from the figure that the data lines 204 of the array of memory cells 200A might be numbered consecutively from data line $204_0$ to data line $204_M$. Other groupings of memory cells 208 commonly connected to a given access line 202 might also define a physical page of memory cells 208. For certain memory devices, all memory cells commonly connected to a given access line might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells might include those memory cells that are configured to be erased together, such as all memory cells connected to access lines $202_0$-$202_N$ (e.g., all NAND strings 206 sharing common access lines 202). Unless expressly distinguished, a reference to a page of memory cells herein refers to the memory cells of a logical page of memory cells.

Although the example of FIG. 2A is discussed in conjunction with NAND flash, the embodiments and concepts described herein are not limited to a particular array architecture or structure, and can include other structures (e.g., SONOS or other data storage structure configured to store charge) and other architectures (e.g., AND arrays, NOR arrays, etc.).

Figure 2B:
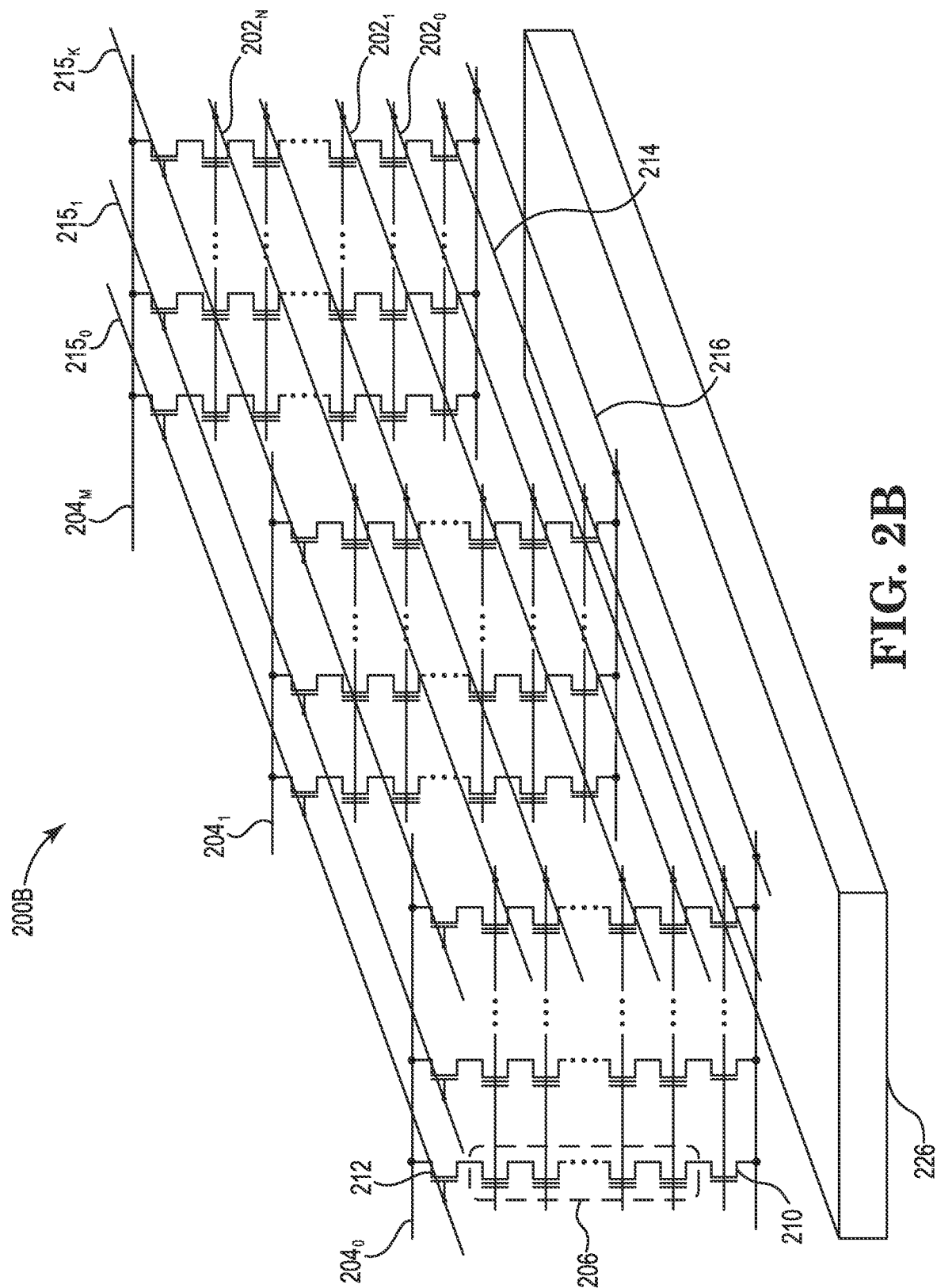

FIG. 2B is another schematic of a portion of an array of memory cells 200B as could be used in a memory of the type described with reference to FIG. 1, e.g., as a portion of array of memory cells 104. Like numbered elements in FIG. 2B correspond to the description as provided with respect to FIG. 2A. FIG. 2B provides additional detail of one example of a three-dimensional NAND memory array structure. The three-dimensional NAND memory array 200B might incorporate vertical structures which might include semiconductor pillars where a portion of a pillar might act as a channel region of the memory cells of NAND strings 206. The NAND strings 206 might be each selectively connected to a data line $204_0$ to $204_M$ by a select transistor 212 (e.g., that might be drain select transistors, commonly referred to as select gate drain) and to a common source 216 by a select transistor 210 (e.g., that might be source select transistors, commonly referred to as select gate source). Multiple NAND strings 206 might be selectively connected to the same data line 204. Subsets of NAND strings 206 can be connected to their respective data lines 204 by biasing the select lines $215_0$ to $215_K$ to selectively activate particular select transistors 212 each between a NAND string 206 and a data line 204. The select transistors 210 can be activated by biasing the select line 214. Each access line 202 might be connected to multiple rows of memory cells of the memory array 200B. Rows of memory cells that are commonly connected to each other by a particular access line 202 might collectively be referred to as tiers.

The three-dimensional NAND memory array 200B might be formed over peripheral circuitry 226. The peripheral circuitry 226 might represent a variety of circuitry for accessing the memory array 200B. The peripheral circuitry 226 might include complementary circuit elements. For example, the peripheral circuitry 226 might include both n-channel and p-channel transistors formed on a same semiconductor substrate, a process commonly referred to as CMOS, or complementary metal-oxide-semiconductors. Although CMOS often no longer utilizes a strict metal-oxide-semiconductor construction due to advancements in integrated circuit fabrication and design, the CMOS designation remains as a matter of convenience.

Figure 2C:
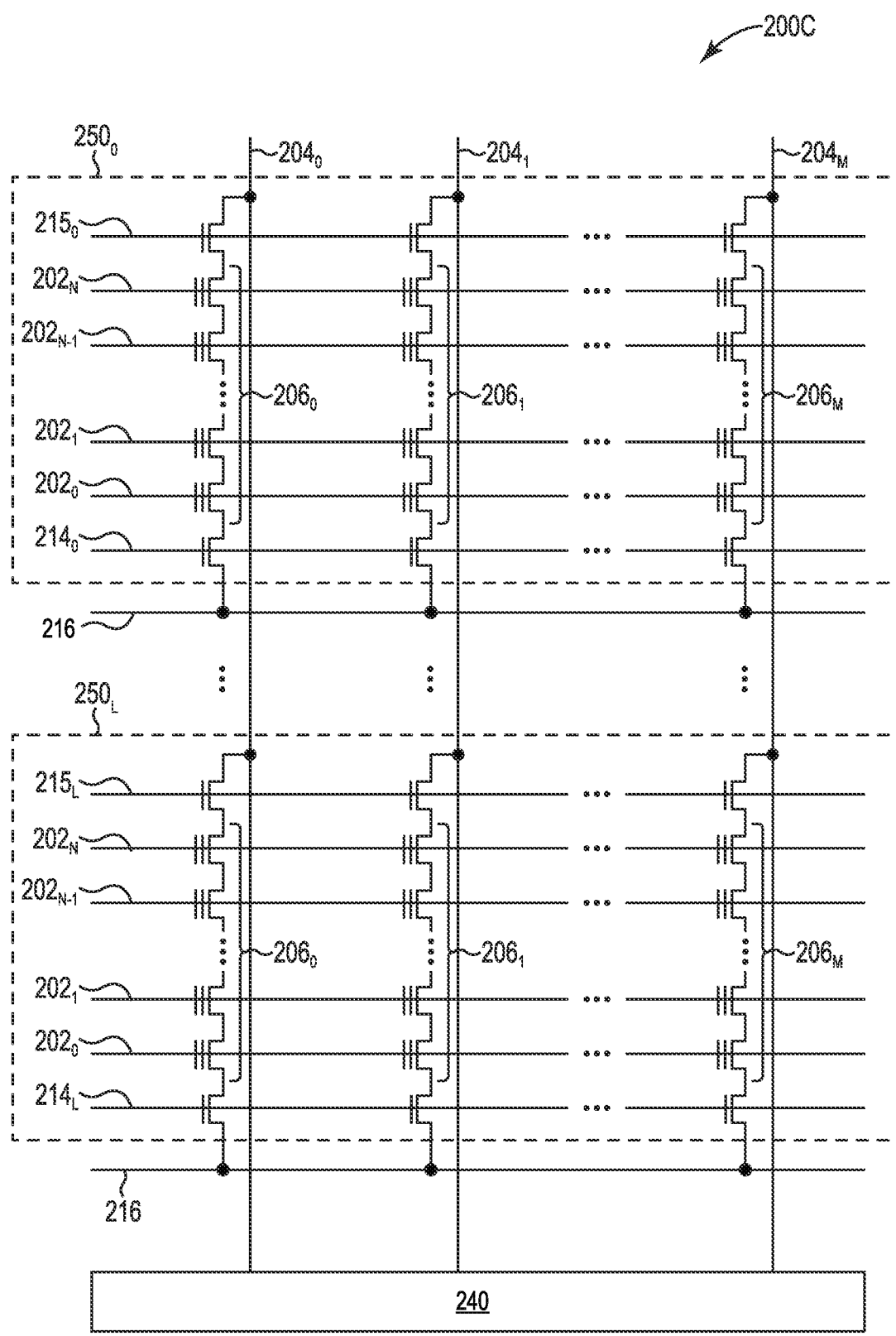

FIG. 2C is a further schematic of a portion of an array of memory cells 200C as could be used in a memory of the type described with reference to FIG. 1, e.g., as a portion of array of memory cells 104. Like numbered elements in FIG. 2C correspond to the description as provided with respect to FIG. 2A. Array of memory cells 200C may include strings of series-connected memory cells (e.g., NAND strings) 206, access (e.g., word) lines 202, data (e.g., bit) lines 204, select lines 214 (e.g., source select lines), select lines 215 (e.g., drain select lines) and source 216 as depicted in FIG. 2A. A portion of the array of memory cells 200A may be a portion of the array of memory cells 200C, for example. FIG. 2C depicts groupings of NAND strings 206 into blocks of memory cells 250, e.g., blocks of memory cells $250_0$ to $250_L$. Blocks of memory cells 250 may be groupings of memory cells 208 that may be erased together in a single erase operation, sometimes referred to as erase blocks. Each block of memory cells 250 might include those NAND strings 206 commonly associated with a single select line 215, e.g., select line $215_0$. The source 216 for the block of memory cells $250_0$ might be a same source as the source 216 for the block of memory cells $250_L$. For example, each block of memory cells $250_0$ to $250_L$ might be commonly selectively connected to the source 216. Access lines 202 and select lines 214 and 215 of one block of memory cells 250 may have no direct connection to access lines 202 and select lines 214 and 215, respectively, of any other block of memory cells of the blocks of memory cells $250_0$ to $250_L$.

The data lines $204_0$ to $204_M$ may be connected (e.g., selectively connected) to a buffer portion 240, which might be a portion of a data buffer of the memory. The buffer portion 240 might correspond to a memory plane (e.g., the set of blocks of memory cells $250_0$ to $250_L$). The buffer portion 240 might include sense circuits (not shown in FIG. 2C) for sensing data values indicated on respective data lines 204.

While the blocks of memory cells 250 of FIG. 2C depict only one select line 215 per block of memory cells 250, the blocks of memory cells 250 might include those NAND strings 206 commonly associated with more than one select line 215. For example, select line $215_0$ of block of memory cells $250_0$ might correspond to the select line $215_0$ of the memory array 200B of FIG. 2B, and the block of memory cells of the memory array 200C of FIG. 2C might further include those NAND strings 206 associated with select lines $215_1$ to $215_K$ of FIG. 2B. In such blocks of memory cells 250 having NAND strings 206 associated with multiple select lines 215, those NAND strings 206 commonly associated with a single select line 215 might be referred to as a sub-block of memory cells. Each such sub-block of memory cells might be selectively connected to the buffer portion 240 responsive to its respective select line 215.

Figure 3A:
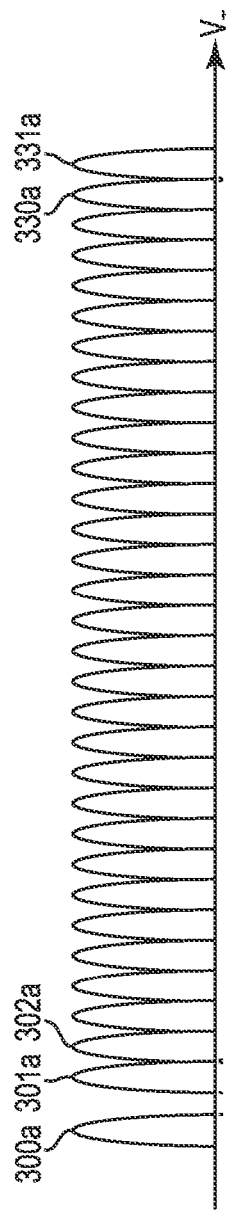
FIG. 3A depicts memory cell populations for a PLC memory immediately after programming, according to an embodiment.

FIG. 3A depicts memory cell populations 300a to 331a for a PLC memory immediately after programming, according to an embodiment. Although memory cell populations 303a-329a are not explicitly depicted in FIG. 3A, it is apparent from the figure that the memory cell populations might be numbered consecutively from memory cell population 300a to memory cell population 331a. PLC memory cells are 32-level memory cells representing data states L0, L1, L2, L3, . . . L31 using 32 threshold voltage ranges, each representing a data state corresponding to a bit pattern of five digits. In this example, the population of memory cells 300a might be erased memory cells and represent data state L0 and a logical data value of '11111', the population of memory cells 301a might represent data state L1 and a logical data value of '11110', the population of memory cells 302a might represent data state L2 and a logical data value of '11101', . . . the population of memory cells 330a might represent data state L30 and a logical data value of '00001', and the population of memory cells 331a might represent data state L31 and a logical data value of '00000'. Although a specific example of binary representation is provided, embodiments may use other arrangements of bit patterns to represent the various data states.

A read window between the population of memory cells 300a and the population of memory cells 301a is indicated at 340, which is the distance (e.g., in voltage) between adjacent Vt distributions for the memory cells representing data states L0 and L1. A read window between the population of memory cells 301a and the population of memory cells 302a is indicated at 341, which is the distance (e.g., in voltage) between adjacent Vt distributions for the memory cells representing data states L1 and L2. Likewise, there is a read window between the other populations of memory cells 302a to 331a depicted in FIG. 3A, including a read window 370 between the population of memory cells 330a and the population of memory cells 331a, which is the distance (e.g., in voltage) between adjacent Vt distributions for the memory cells representing data states L30 and L31. A read window budget (RWB) may refer to a cumulative value of read windows for a group of programmed cells (e.g., one or more pages of cells). In this example, the RWB may be the cumulative value (e.g., in voltage) of the 31 read windows between the 32 Vt distributions of memory cell populations 300a to 331a.

Figure 3B:
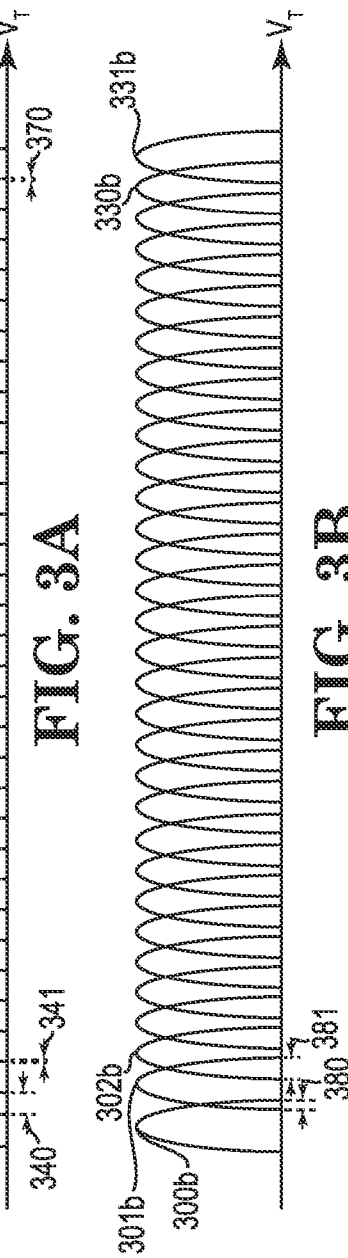
FIG. 3B depicts memory cell populations for the PLC memory of FIG. 3A after a given retention time, according to an embodiment.

FIG. 3B depicts memory cell populations 300b to 331b for the PLC memory of FIG. 3A after a given retention time (e.g., one week), according to an embodiment. Although memory cell populations 303b-329b are not explicitly depicted in FIG. 3B, it is apparent from the figure that the memory cell populations might be numbered consecutively from memory cell population 300b to memory cell population 331b. Due to charge loss over time, the threshold voltages of the memory cell populations 300a to 331a of FIG. 3A may shift down as indicated by the memory cell populations 300b to 331b of FIG. 3B, resulting in the memory cell populations 300b to 331b overlapping with adjacent memory cell populations. For example, the population of memory cells 300b overlaps the population of memory cells 301b as indicated at 380, and the population of memory cells 301b overlaps the population of memory cells 302b as indicated at 381. The overlapping regions between the memory cell populations 300b to 331b indicate error bits, which may be correctable by ECC engine 126 of FIG. 1.

Figure 4A:
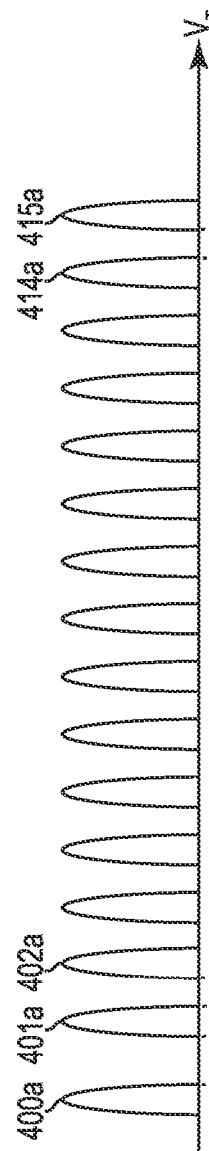
FIG. 4A depicts memory cell populations for a QLC memory immediately after programming, according to an embodiment.

FIG. 4A depicts memory cell populations 400a to 415a for a QLC memory immediately after programming, according to an embodiment. Although memory cell populations 403a-413a are not explicitly depicted in FIG. 4A, it is apparent from the figure that the memory cell populations might be numbered consecutively from memory cell population 400a to memory cell population 415a. QLC memory cells are 16-level memory cells representing data states L0, L1, L2, L3, . . . L15 using 16 threshold voltage ranges, each representing a data state corresponding to a bit pattern of four digits. In this example, the population of memory cells 400a might be erased memory cells and represent data state L0 and a logical data value of '1111', the population of memory cells 401a might represent data state L1 and a logical data value of '1110', the population of memory cells 402a might represent data state L2 and a logical data value of '1101', . . . the population of memory cells 414a might represent data state L14 and a logical data value of '0001', and the population of memory cells 415a might represent data state L15 and a logical data value of '0000'. Although a specific example of binary representation is provided, embodiments may use other arrangements of bit patterns to represent the various data states.

A read window between the population of memory cells 400a and the population of memory cells 401a is indicated at 440a, which is the distance (e.g., in voltage) between adjacent Vt distributions for the memory cells representing data states L0 and L1. A read window between the population of memory cells 401a and the population of memory cells 402a is indicated at 441a, which is the distance (e.g., in voltage) between adjacent Vt distributions for the memory cells representing data states L1 and L2. Likewise, there is a read window between the other populations of memory cells 402a to 415a depicted in FIG. 4A, including a read window 454a between the population of memory cells 414a and the population of memory cells 415a, which is the distance (e.g., in voltage) between adjacent Vt distributions for the memory cells representing data states L14 and L15. In this example, the RWB may be the cumulative value (e.g., in voltage) of the 15 read windows between the 16 Vt distributions of memory cell populations 400a to 415a. Comparing the QLC memory of FIG. 4A to the PLC memory of FIG. 3A, it is apparent that as the number of bits per memory cell increases, the RWB decreases. That is, read windows 440a, 441a, and 454a of the QLC memory of FIG. 4A are larger than read windows 340, 341, and 370 of the PLC memory of FIG. 3A.

Figure 4B:
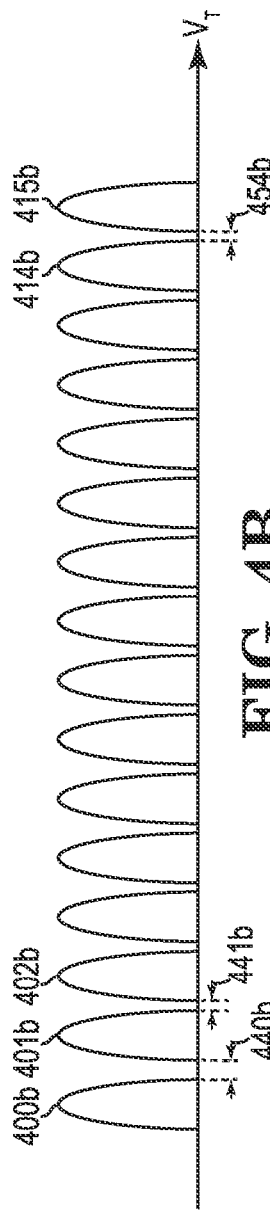
FIG. 4B depicts memory cell populations for the QLC memory of FIG. 4A after the given retention time, according to an embodiment.

FIG. 4B depicts memory cell populations 400b to 415b for the QLC memory of FIG. 4A after the given retention time (e.g., one week), according to an embodiment. Although memory cell populations 403b-413b are not explicitly depicted in FIG. 4B, it is apparent from the figure that the memory cell populations might be numbered consecutively from memory cell population 400b to memory cell population 415b. Due to charge loss over time, the threshold voltages of the memory cell populations 400a to 415a of FIG. 4A may shift down as indicated by memory cell populations 400b to 415b of FIG. 4B. In this example, the read window between the populations of memory cells 400b to 415b are reduced after the given retention time, but do not overlap. For example, the read window between the population of memory cells 400b and the population of memory cells 401b is as indicated at 440b is reduced compared to the read window 440a of FIG. 4A, the read window between the population of memory cells 401b and the population of memory cells 402b as indicated at 441b is reduced compared to the read window 441a of FIG. 4A, and the read window between the population of memory cells 414b and the population of memory cells 415b as indicated at 454b is reduced compared to read window 454a of FIG. 4A. Thus, compared to the PLC memory of FIG. 3B, the QLC memory of FIG. 4B may retain data for longer periods without errors.

This larger RWB for memory cells storing fewer bits per memory cell is exploited by embodiments of the current disclosure to improve the quality of service (QoS) of the memory device. As described below with reference to FIGS. 5A-5D, by initially storing a first number of bits in first memory cells and a second number of bits in second memory cells, and then later merging at least a subset of the first number of bits to the second number of bits in the second memory cells, the second memory cells may store more bits per memory cell for a longer period without errors than if all the bits were initially stored in the second memory cells.

Figure 5A:
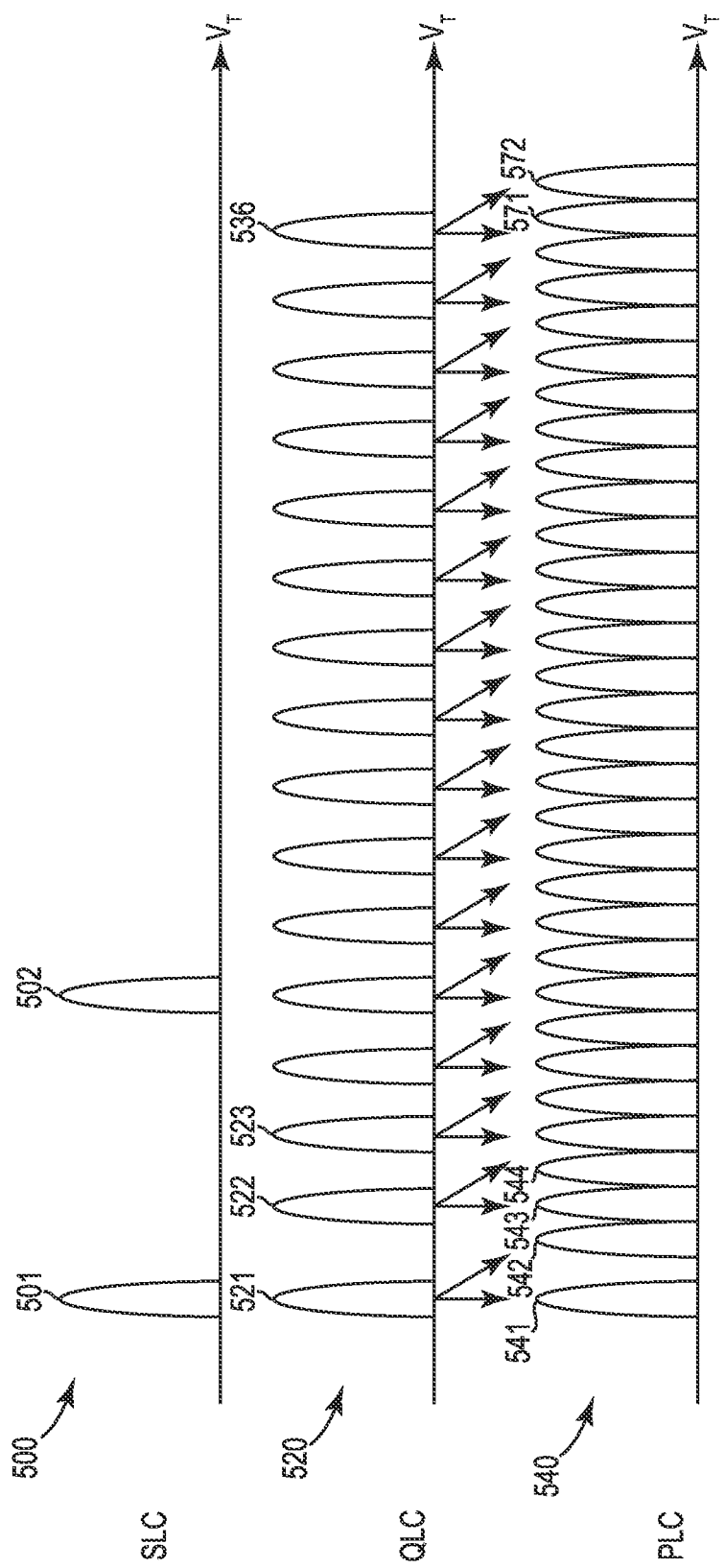
FIG. 5A depicts the merging of an SLC block of memory cells with a QLC block of memory cells to provide a PLC block of memory cells, according to an embodiment.

FIG. 5A depicts the merging of the bits stored in a SLC block of memory cells with the bits stored in a QLC block of memory cells such that the QLC block of memory cells becomes a PLC block of memory cells, according to an embodiment. Memory cell populations for a SLC block of memory cells is indicated at 500, memory cell populations for a QLC block of memory cells is indicated at 520, and memory cell populations for a PLC block of memory cells after merging the bits stored in the SLC block of memory cells with the bits stored in the QLC block of memory cells is indicated at 540. SLC memory cells are single level memory cells representing data states L0 and L1 using two threshold voltage ranges, each representing a data state corresponding to one digit (e.g., bit) of data. In this example, the population of memory cells 501 might be erased memory cells and represent data state L0 and a logical data value of '1', and the population of memory cells 502 might represent data state L1 and a logical data value of '0'.

As previously described with reference to FIG. 4A, QLC memory cells are 16-level memory cells representing data states L0, L1, L2, L3, . . . L15 using 16 threshold voltage ranges, each representing a data state corresponding to a bit pattern of four digits. In this example, the population of memory cells 521 might be erased memory cells and represent data state L0, the population of memory cells 522 might represent data state L1, the population of memory cells 523 might represent data state L2, . . . and the population of memory cells 536 might represent data state L15. Although QLC memory cell populations 524-535 are not explicitly depicted in FIG. 5A, it is apparent from the figure that the QLC memory cell populations 520 might be numbered consecutively from memory cell population 521 to memory cell population 536. As previously described with reference to FIG. 3A, PLC memory cells are 32-level memory cells representing data states L0, L1, L2, L3, . . . L31 using 32 threshold voltage ranges, each representing a data state corresponding to a bit pattern of five digits. In this example, the population of memory cells 541 might be erased memory cells and represent data state L0, the population of memory cells 542 might represent data state L1, the population of memory cells 543 might represent data state L2, . . . and the population of memory cells 572 might represent data state L31. Although PLC memory cell populations 545-570 are not explicitly depicted in FIG. 5A, it is apparent from the figure that the PLC memory cell populations 540 might be numbered consecutively from memory cell population 541 to memory cell population 572.

In some examples, the SLC block of memory cells might be a first block 250 (e.g., $250_0$) of FIG. 2C, and the QLC block of memory cells (and after merging the PLC block of memory cells) might be a second block 250 (e.g., $250_L$) of FIG. 2C. The memory cells 208 of the first (SLC) block might correspond to the memory cells 208 of the second (QLC) block. The bit stored in each memory cell of the first (SLC) block may be merged with the bits stored in each corresponding memory cell of the second (QLC) block (e.g., the bit stored in each memory cell $208_0$ to $208_N$ of each NAND string $206_0$ to $206_M$ of block $250_0$ may be merged with the bits stored in each memory cell $208_0$ to $208_N$ of each NAND string $206_0$ to $206_M$ of block $250_L$, respectively), such that the second (QLC) block becomes a PLC block. Thus, the one bit stored in each memory cell of the SLC block is merged with the four bits stored in each corresponding memory cell of the QLC block to provide a PLC block storing five bits in each memory cell.

Initially, the memory cells of the SLC block and the corresponding memory cells of the QLC block are programmed. To program the SLC block, the memory cells of the SLC block might be first erased to the L0 data state as indicated at 501. Next, a portion of the memory cells of the SLC block might be programmed to the L1 data state as indicated at 502. To program the QLC block, the memory cells of the QLC block might first be erased to the L0 data state as indicated at 521. Next, a portion of the memory cells of the QLC block might be programmed to the L1 through L15 data states as indicated at 522 to 536, respectively, using one or multiple programming passes.

Following a period (e.g., within a range where a read operation of the memory cells of the QLC block would complete successfully [such as within the limits of the ECC engine 126 of FIG. 1 to detect and correct any bit errors]) after programming the memory cells of the SLC block and the QLC block, the bits stored in the memory cells of the SLC block might be merged with the bits stored in corresponding memory cells of the QLC block. The bits stored in the memory cells of the SLC block might be merged with the bits stored in the corresponding memory cells of the QLC block without erasing the memory cells of the QLC block. For example, based on the corresponding memory cells of memory cell populations 501 and 502 of the SLC block, a portion of the population of memory cells 521 of the QLC block might be programmed to provide the population of memory cells 542 of the PLC block (e.g., based on corresponding memory cells programmed to the L1 data state as indicated at 502), while the remaining portion of the population of memory cells 521 of the QLC block might remain/become the population of memory cells 541 of the PLC block (e.g., based on corresponding memory cells programmed to the L0 data state as indicated at 501). Based on the corresponding memory cells of memory cell populations 501 and 502 of the SLC block, a portion of the population of memory cells 522 of the QLC block might be programmed to provide the population of memory cells 544 of the PLC block, while the remaining portion of the population of memory cells 522 of the QLC block might remain/become the population of memory cells 543 of the PLC block. Likewise, based on the corresponding memory cells of memory cell populations 501 and 502 of the SLC block, a portion of the population of memory cells 536 of the QLC block might be programmed to provide the population of memory cells 572 of the PLC block, while the remaining portion of the population of memory cells 536 of the QLC block might remain/become the population of memory cells 571 of the PLC block.

In summary, a first block of memory cells might be programed as a SLC block, and a second block of memory cells might be programmed as a QLC block. Following a period after programming the first block of memory cells and the second block of memory cells, the bits stored in the first block of memory cells might be merged with the bits stored in the second block of memory cells without erasing the second block of memory cells such that the second block of memory cells is programmed as a PLC block. The first block of memory cells might be erased after merging the bits stored in the first block of memory cells with the bits stored in the second block of memory cells. In some examples, prior to merging the bits stored in the first block of memory cells with the bits stored in the second block of memory cells, a touch up programming operation might be performed on one or more memory cells of the second block of memory cells to increase a threshold voltage of each of the one or more memory cells towards a respective desired threshold voltage of each of the one or more memory cells.

FIG. 5B depicts the merging of one half of the bits stored in a MLC block of memory cells with the bits stored in a QLC block of memory cells such that the QLC block of memory cells becomes a PLC block of memory cells, according to an embodiment. Memory cell populations for a MLC block of memory cells is indicated at 510, memory cell populations for a QLC block of memory cells is indicated at 520 as previously described and illustrated with reference to FIG. 5A, and memory cell populations for a PLC block of memory cells after merging one half of the bits stored in the MLC block of memory cells with the bits stored in the QLC block of memory cells is indicated at 540. MLC memory cells are four-level memory cells representing data states L0, L1, L2, and L3 using four threshold voltage ranges, each representing a data state corresponding to a bit pattern of two digits. In this example, the population of memory cells 511 might be erased memory cells and represent data state L0 and a logical data value of '11', the population of memory cells 512 might represent data state L1 and a logical data value of '10', the population of memory cells 513 might represent data state L2 and a logical data value of '01', and the population of memory cells 514 might represent data state L3 and logic data value of '00'. Although a specific example of binary representation is provided, embodiments may use other arrangements of bit patterns to represent the various data states.

In some examples, the MLC block of memory cells might be a first block 250 (e.g., $250_0$) of FIG. 2C, and the QLC block of memory cells (and after merging the PLC block of memory cells) might be a second block 250 (e.g., $250_L$) of FIG. 2C. The memory cells 208 of the first (MLC) block might correspond to the memory cells 208 of the second (QLC) block. One half of the bits (e.g., 1 bit) stored in each memory cell of the first (MLC) block may be merged with the bits stored in each corresponding memory cell of the second (QLC) block (e.g., one bit stored in each memory cell $208_0$ to $208_N$ of each NAND string $206_0$ to $206_M$ of block $250_0$ may be merged with the bits stored in each memory cell $208_0$ to $208_N$ of each NAND string $206_0$ to $206_M$ of block $250_L$, respectively), such that the second (QLC) block becomes a PLC block. The remaining one half of the bits stored in the memory cells 208 of the first (MLC) block may be merged with another QLC block 250. Thus, a first bit stored in each memory cell of the MLC block might be merged with the four bits stored in each corresponding memory cell of a first QLC block to provide a first PLC block storing five bits in each memory cell, and a second bit stored in each memory cell of the MLC block might be merged with the four bits stored in each corresponding memory cell of a second QLC block to provide a second PLC block storing five bits in each memory cell.

Initially, the memory cells of the MLC block and the corresponding memory cells of the QLC block are programmed. To program the MLC block, the memory cells of the MLC block might be first erased to the L0 data state as indicated at 511. Next, a portion of the memory cells of the MLC block might be programmed to the L1, L2, and L3 data states as indicated at 512, 513, and 514, respectively, using one or multiple programming passes. To program the QLC block, the memory cells of the QLC block might first be erased to the L0 data state as indicated at 521. Next, a portion of the memory cells of the QLC block might be programmed to the L1 through L15 data states as indicated at 522 to 536, respectively, using one or multiple programming passes.

Following a period (e.g., within a range where a read operation of the memory cells of the QLC block would complete successfully [such as within the limits of the ECC engine 126 of FIG. 1 to detect and correct any bit errors]) after programming the memory cells of the MLC block and the QLC block, one of the two bits stored in the memory cells of the MLC block might be merged with the bits stored in corresponding memory cells of the QLC block. One of the two bits stored in memory cells of the MLC block might be merged with the bits stored in the corresponding memory cells of the QLC block without erasing the memory cells of the QLC block. For example, based on the corresponding memory cells of memory cell populations 511, 512, 513, and 514 of the MLC block, a portion of the population of memory cells 521 of the QLC block might be programmed to provide the population of memory cells 542 of the PLC block, while the remaining portion of the population of memory cells 521 of the QLC block might remain/become the population of memory cells 541 of the PLC block. Based on the corresponding memory cells of memory cell populations 511, 512, 513, and 514 of the MLC block, a portion of the population of memory cells 522 of the QLC block might be programmed to provide the population of memory cells 544 of the PLC block, while the remaining portion of the population of memory cells 522 of the QLC block might remain/become the population of memory cells 543 of the PLC block. Likewise, based on the corresponding memory cells of memory cell populations 511, 512, 513, and 514 of the SLC block, a portion of the population of memory cells 536 of the QLC block might be programmed to provide the population of memory cells 572 of the PLC block, while the remaining portion of the population of memory cells 536 of the QLC block might remain/become the population of memory cells 571 of the PLC block.

In summary, a first block of memory cells might be programed as a MLC block, and a second block of memory cells might be programmed as a QLC block. Following a period after programming the first block of memory cells and the second block of memory cells, one half of the bits stored in the first block of memory cells might be merged with the bits stored in the second block of memory cells without erasing the second block of memory cells such that the second block of memory cells is programmed as a PLC block. In some examples, prior to merging one half of the bits stored in the first block of memory cells with the bits stored in the second block of memory cells, a touch up programming operation might be performed on one or more memory cells of the second block of memory cells to increase a threshold voltage of each of the one or more memory cells towards a respective desired threshold voltage of each of the one or more memory cells.

Figure 5C:
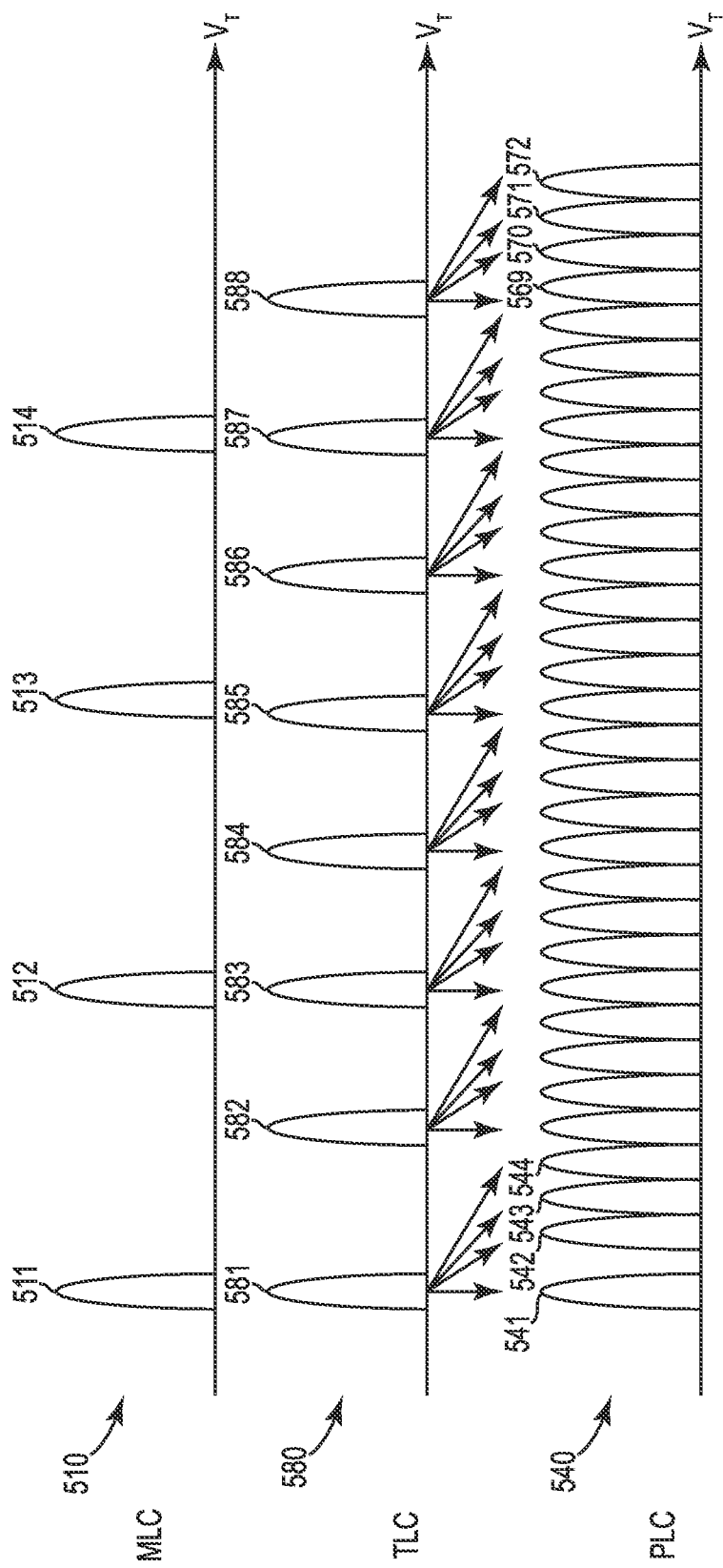
FIG. 5C depicts the merging of a MLC block of memory cells with a TLC block of memory cells to provide a PLC block of memory cells, according to an embodiment.

FIG. 5C depicts the merging of the bits stored in a MLC block of memory cells with the bits stored in a TLC block of memory cells such that the TLC block of memory cells becomes a PLC block of memory cells, according to an embodiment. Memory cell populations for a MLC block of memory cells is indicated at 510 as previously described and illustrated with reference to FIG. 5B, memory cell populations for a TLC block of memory cells is indicated at 580, and memory cell populations for a PLC block of memory cells after merging the bits stored in the MLC block of memory cells with the bits stored in the TLC block of memory cells is indicated at 540. TLC memory cells are eight-level memory cells representing data states L0, L1, L2, L3, L4, L5, L6, and L7 using eight threshold voltage ranges, each representing a data state corresponding to a bit pattern of three bits. In this example, the population of memory cells 581 might be erased memory cells and represent data state L0 and a logical data value of '111', the population of memory cells 582 might represent data state L1 and a logical data value of '110', the population of memory cells 583 might represent data state L2 and a logical data value of '101', the population of memory cells 584 might represent data state L3 and a logical data value of '100', the population of memory cells 585 might represent data state L4 and a logical data value of '011', the population of memory cells 586 might represent data state L5 and a logical data value of '010', the population of memory cells 587 might represent data state L6 and a logical data value of '001', and the population of memory cells 588 might represent data state L7 and a logical data value of '000'. Although a specific example of binary representation is provided, embodiments may use other arrangements of bit patterns to represent the various data states.

In some examples, the MLC block of memory cells might be a first block 250 (e.g., $250_0$) of FIG. 2C, and the TLC block of memory cells (and after merging the PLC block of memory cells) might be a second block 250 (e.g., $250_L$) of FIG. 2C. The memory cells 208 of the first (MLC) block might correspond to the memory cells 208 of the second (TLC) block. The bits stored in the each memory cell of the first (MLC) block may be merged with the bits stored in each corresponding memory cell of the second (TLC) block (e.g., bits stored in each memory cell $208_0$ to $208_N$ of each NAND string $206_0$ to $206_M$ of block $250_0$ may be merged with the bits stored in each memory cell $208_0$ to $208_N$ of each NAND string $206_0$ to $206_M$ of block $250_L$, respectively), such that the second (TLC) block becomes a PLC block. Thus, the two bits stored in each memory cell of the MLC block are merged with the three bits stored in each corresponding memory cell of the TLC block to provide a PLC block storing five bits in each memory cell.

Initially, the memory cells of the MLC block and the corresponding memory cells of the TLC block are programmed. To program the MLC block, the memory cells of the MLC block might be first erased to the L0 data state as indicated at 511. Next, a portion of the memory cells of the MLC block might be programmed to the L1, L2, and L3 data states as indicated at 512, 513, and 514, respectively, using one or multiple programming passes. To program the TLC block, the memory cells of the TLC block might first be erased to the L0 data state as indicated at 581. Next, a portion of the memory cells of the TLC block might be programmed to the L1 through L7 data states as indicated at 581 to 588, respectively, using one or multiple programming passes.

Following a period (e.g., within a range where a read operation of the memory cells of the TLC block would complete successfully [such as within the limits of the ECC engine 126 of FIG. 1 to detect and correct any bit errors]) after programming the memory cells of the MLC block and the TLC block, the bits stored in memory cells of the MLC block might be merged with the bits stored in corresponding memory cells of the TLC block. The bits stored in memory cells of the MLC block might be merged with the bits stored in the corresponding memory cells of the TLC block without erasing the memory cells of the TLC block. For example, based on the corresponding memory cells of memory cell populations 511, 512, 513, and 514 of the MLC block, a portion of the population of memory cells 581 of the TLC block might be programmed to provide the population of memory cells 542 (e.g., based on corresponding memory cells programmed to the L1 data state as indicated at 512), 543 (e.g., based on corresponding memory cells programmed to the L2 data state as indicated at 513), and 544 (e.g., based on corresponding memory cells programmed to the L3 data state as indicated at 514) of the PLC block, while the remaining portion of the population of memory cells 581 of the TLC block might remain/become the population of memory cells 541 of the PLC block (e.g., based on corresponding memory cells programmed to the L0 data state as indicated at 511). Likewise, based on the corresponding memory cells of memory cell populations 511, 512, 513, and 514 of the MLC block, a portion of the population of memory cells 588 of the TLC block might be programmed to provide the population of memory cells 570, 571, and 572 of the PLC block, while the remaining portion of the population of memory cells 588 of the TLC block might remain/become the population of memory cells 569 of the PLC block.

In summary, a first block of memory cells might be programed as a MLC block, and a second block of memory cells might be programmed as a TLC block. Following a period after programming the second block of memory cells, the bits stored in the first block of memory cells might be merged with the bits stored in the second block of memory cells without erasing the second block of memory cells such that the second block of memory cells is programmed as a PLC block. The first block of memory cells might be erased after merging the bits stored in the first block of memory cells with the bits stored in the second block of memory cells. In some examples, prior to merging the bits stored in the first block of memory cells with the bits stored in the second block of memory cells, a touch up programming operation might be performed on one or more memory cells of the second block of memory cells to increase a threshold voltage of each of the one or more memory cells towards a respective desired threshold voltage of each of the one or more memory cells.

Figure 5D:
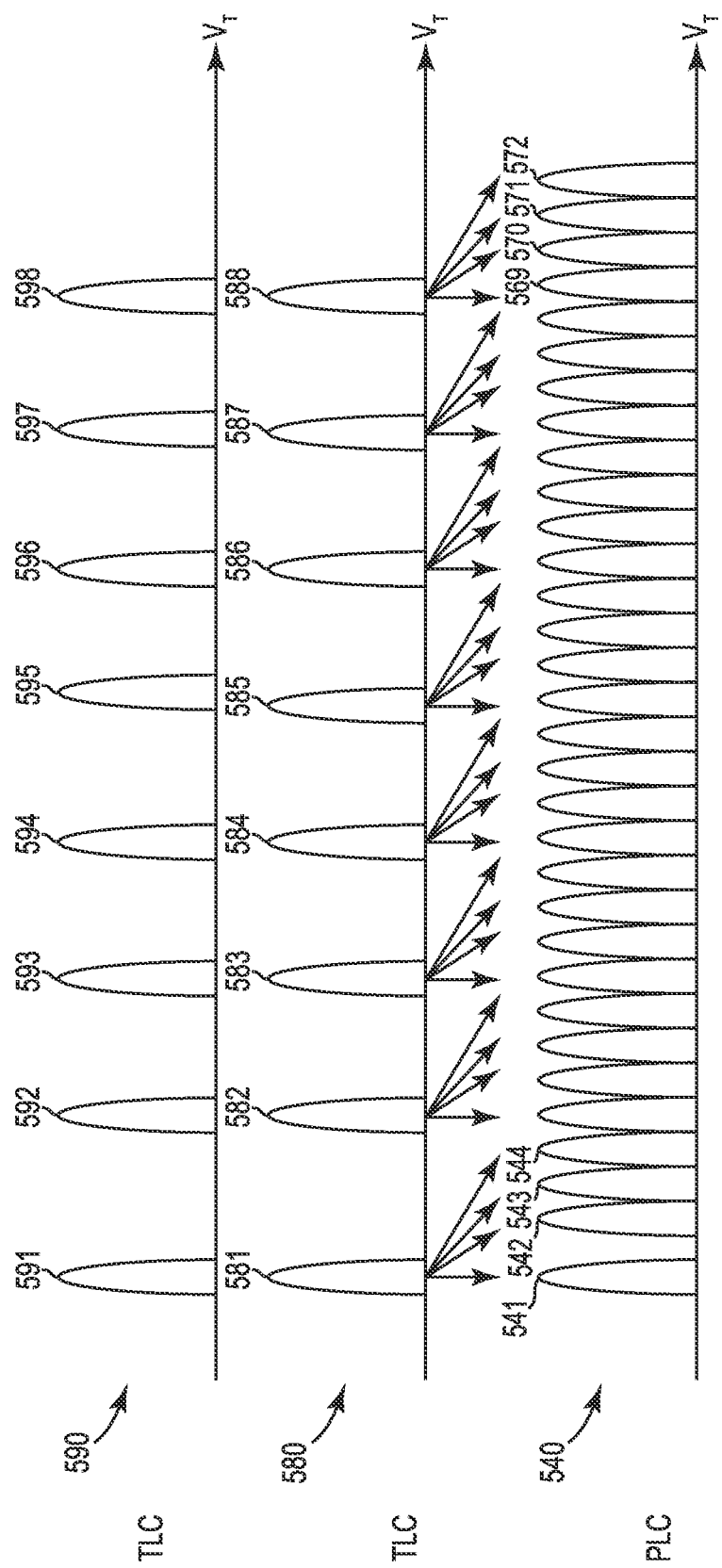
FIG. 5D depicts the merging of a TLC block of memory cells with a TLC block of memory cells to provide a PLC block of memory cells, according to an embodiment.

FIG. 5D depicts the merging of two-thirds of the bits stored in a first TLC block of memory cells with the bits stored in a second TLC block of memory cells such that the second TLC block of memory cells becomes a PLC block of memory cells, according to an embodiment. Memory cell populations for a first TLC block of memory cells is indicated at 590, memory cell populations for a second TLC block of memory cells is indicated at 580 as previously described and illustrated with reference to FIG. 5C, and memory cell populations for a PLC block of memory cells after merging two-thirds of the bits stored in the first TLC block of memory cells with the bits stored in the second TLC block of memory cells is indicated at 540. The first TLC block of memory cells includes populations of memory cells 591 to 598 representing data states L0 through L7, respectively.

In some examples, the first TLC block of memory cells might be a first block 250 (e.g., $250_0$) of FIG. 2C, and the second TLC block of memory cells (and after merging the PLC block of memory cells) might be a second block 250 (e.g., $250_L$) of FIG. 2C. The memory cells 208 of the first (TLC) block might correspond to the memory cells 208 of the second (TLC) block. Two-thirds of the bits (e.g., 2 bits) stored in each memory cell of the first (TLC) block may be merged with the bits stored in each corresponding memory cell of the second (TLC) block (e.g., two bits stored in each memory cell $208_0$ to $208_N$ of each NAND string $206_0$ to $206_M$ of block $250_0$ may be merged with the bits stored in each memory cell $208_0$ to $208_N$ of each NAND string $206_0$ to $206_M$ of block $250_L$, respectively), such that the second (TLC) block becomes a PLC block. The remaining one bit stored in the memory cells 208 of the first (TLC) block may be used to store extra parity bits for ECC. Thus, two bits stored in each memory cell of the first TLC block might be merged with the three bits stored in each corresponding memory cell of a second TLC block to provide a PLC block storing five bits in each memory cell.

Initially, the memory cells of the first TLC block and the corresponding memory cells of the second TLC block are programmed. To program the first TLC block, the memory cells of the first TLC block might be first erased to the L0 data state as indicated at 591. Next, a portion of the memory cells of the first TLC block might be programmed to the L1 through L7 data states as indicated at 592 to 598, respectively, using one or multiple programming passes. To program the second TLC block, the memory cells of the second TLC block might first be erased to the L0 data state as indicated at 581. Next, a portion of the memory cells of the second TLC block might be programmed to the L1 through L7 data states as indicated at 582 to 588, respectively, using one or multiple programming passes.

Following a period (e.g., within a range where a read operation of the memory cells of the second TLC block would complete successfully [such as within the limits of the ECC engine 126 of FIG. 1 to detect and correct any bit errors]) after programming the memory cells of the first TLC block and the second TLC block, two of the three bits stored in the memory cells of the first TLC block might be merged with the bits stored in corresponding memory cells of the second TLC block. Two of the three bits stored in memory cells of the first TLC block might be merged with the bits stored in the corresponding memory cells of the second TLC block without erasing the memory cells of the second TLC block. For example, based on the corresponding memory cells of memory cell populations 591 to 598 of the first TLC block, a portion of the population of memory cells 581 of the second TLC block might be programmed to provide the population of memory cells 542, 543, and 544 of the PLC block, while the remaining portion of the population of memory cells 581 of the second TLC block might remain/become the population of memory cells 541 of the PLC block. Likewise, based on the corresponding memory cells of memory cell populations 591 to 594 of the first TLC block, a portion of the population of memory cells 588 of the second TLC block might be programmed to provide the population of memory cells 570, 571, and 572 of the PLC block, while the remaining portion of the population of memory cells 588 of the second TLC block might remain/become the population of memory cells 569 of the PLC block.

In summary, a first block of memory cells might be programed as a TLC block, and a second block of memory cells might be programmed as a TLC block. Following a period after programming the second block of memory cells, two-thirds of the bits stored in the first block of memory cells might be merged with the bits stored in the second block of memory cells without erasing the second block of memory cells such that the second block of memory cells is programmed as a PLC block. In some examples, prior to merging two-thirds of the bits stored in the first block of memory cells with the bits stored in the second block of memory cells, a touch up programming operation might be performed on one or more memory cells of the second block of memory cells to increase a threshold voltage of each of the one or more memory cells towards a respective desired threshold voltage of each of the one or more memory cells.

Figure 6:
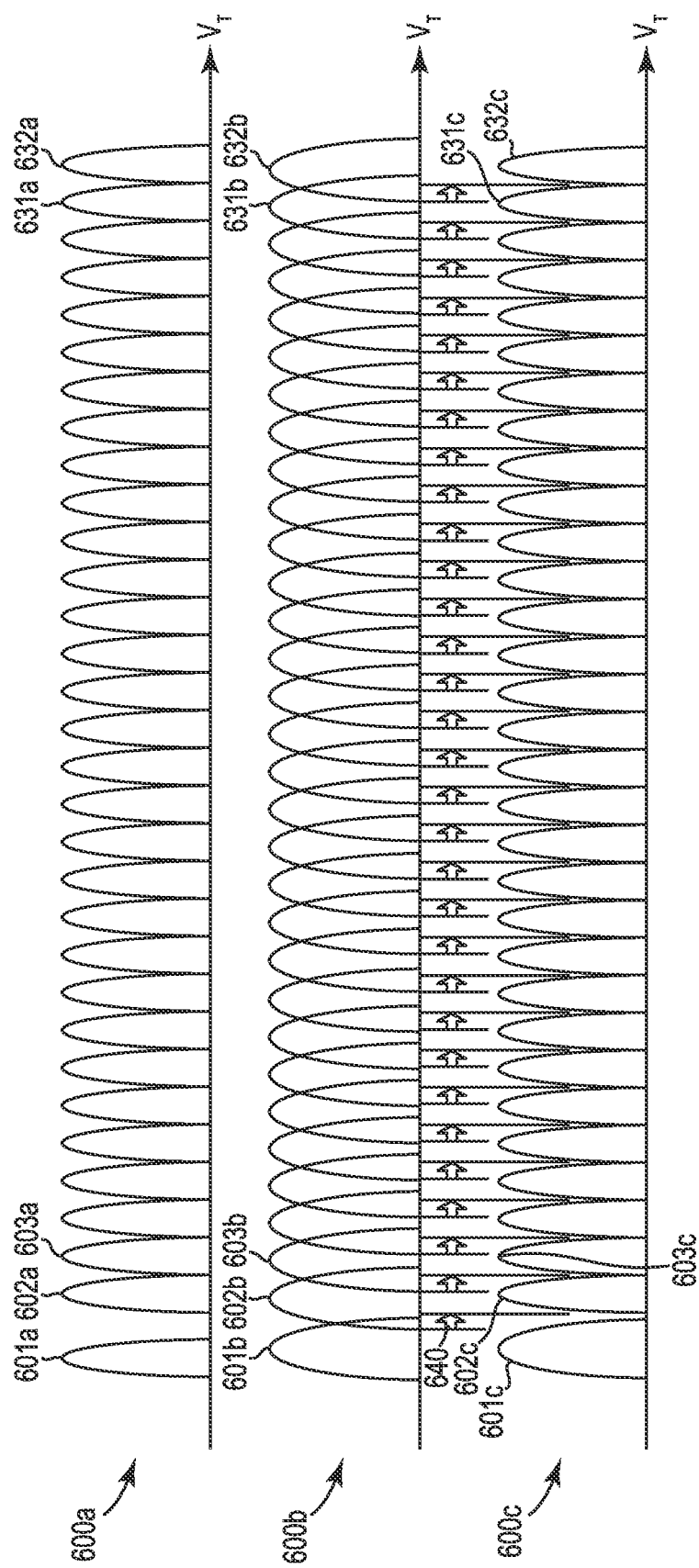
FIG. 6 depicts memory cell populations for a PLC memory immediately after programming, after a given retention time, and immediately after a touch up programming operation, according to an embodiment.

FIG. 6 depicts memory cell populations for a PLC memory immediately after programming as indicated at 600a, after a given retention time as indicated at 600b, and immediately after a touch up programming operation as indicated at 600c, according to an embodiment. PLC memory populations 600a might represent data states L0 through L31 as indicated at 601a to 632a, respectively. Although PLC memory cell populations 604a-630a are not explicitly depicted in FIG. 6, it is apparent from the figure that the PLC memory cell populations 600a might be numbered consecutively from memory cell population 601a to memory cell population 632a. As previously described and illustrated with reference to FIG. 3A, there is a read window between each of the memory cell populations 601a to 632a, where a RWB may be the cumulative value (e.g., in voltage) of the 31 read windows between the 32 Vt distributions of memory cell populations 601a to 632a.

Memory cell populations 600b include memory cell populations 601b to 632b for the PLC memory after a given retention time (e.g., one week). Although PLC memory cell populations 604b-630b are not explicitly depicted in FIG. 6, it is apparent from the figure that the PLC memory cell populations 600b might be numbered consecutively from memory cell population 601b to memory cell population 632b. As previously described with reference to FIG. 3B, due to charge loss over time, the threshold voltages of the memory cell populations 601a to 632a indicated at 600a may shift down as indicated by the memory cell populations 601b to 632b, resulting in the memory cell populations 601b to 632b overlapping with adjacent memory cell populations. The overlapping regions between the memory cell populations 601b to 632b indicate error bits, which may be correctable by ECC engine 126 of FIG. 1.

To correct the errors due to charge loss over time, a touch up programming operation may be performed on the memory cell populations 601b to 632b to restore the data. During a touch up programming operation, memory cells of the memory cell populations 601b to 632b having a threshold voltage lower than a designated threshold voltage might be reprogrammed to restore their threshold voltages as indicated at 640 to provide touched up memory cell populations 601c to 632c.

As previously described, the ECC engine 126 of FIG. 1 might determine which memory cells have a reduced threshold voltage. If one or more memory cells are identified as having a reduced threshold voltage, the ECC engine 126 and/or the control logic 116, might facilitate performing a touch up programming operation on the identified memory cells to increase their threshold voltage levels to restore them to their pre-threshold voltage drift levels. In other words, the touch up programming operation facilitates restoring an amount of charge as indicated at 640 (e.g., such as without first performing an erase operation) to the charge storage structures of the memory cells such that their threshold voltages again have a level corresponding to their intended (e.g., desired) programmed levels. A verify operation might be performed along with the touch up programming operation to verify that the desired threshold voltage levels for the memory cells have been restored. Thus, according to various embodiments of the present disclosure, a touch up programming operation might be performed on memory cells identified as experiencing reduction in threshold voltage levels responsive to performing an ECC operation.

Figure 7:
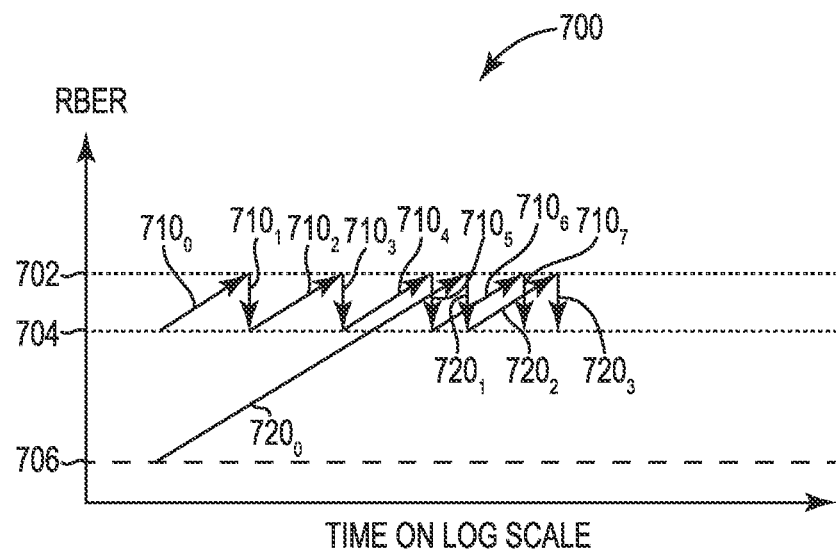
FIG. 7 is a chart depicting raw bit error rate (RBER) versus time illustrating RWB and quality of service (QoS) improvement due to the merging of an SLC block of memory cells with a QLC block of memory cells to provide a PLC block of memory cells, according to an embodiment.

FIG. 7 is a chart 700 depicting raw bit error rate (RBER) versus time (on log scale) illustrating RWB and quality of service (QoS) improvement due to the merging of the bits stored in an SLC block of memory cells with the bits stored in a QLC block of memory cells to provide a PLC block of memory cells as previously described and illustrated with reference to FIG. 5A, according to an embodiment. A threshold RBER is indicated at 702, a first RBER immediately after programming a PLC block of memory cells is indicated at 704, and a second RBER immediately after programming a QLC block of memory cells is indicated at 706. Arrows $710_0$ to $710_7$ indicate a changing RBER for a PLC block of memory cells starting immediately after programming the PLC block of memory cells. Arrow $710_0$ indicates an increasing RBER over time for a PLC block of memory cells. Arrow $710_1$ indicates a touch up programming operation on the PLC block of memory cells once the RBER reaches the threshold RBER 702 to reduce the RBER back down to the first RBER 704. Arrow $710_2$ indicates an again increasing RBER over time for the PLC block of memory cells. Arrow $710_3$ indicates another touch up programming operation on the PLC block of memory cells once the RBER reaches the threshold RBER 702 to reduce the RBER back down to the first RBER 704. Arrow $710_4$ indicates an again increasing RBER over time for the PLC memory. Arrow $710_5$ indicates another touch up programming operation on the PLC block of memory cells once the RBER reaches the threshold RBER 702 to reduce the RBER back down to the first RBER 704. Arrow $710_6$ indicates an again increasing RBER over time for the PLC block of memory cells. Arrow $710_7$ indicates another touch up programming operation on the PLC block of memory cells once the RBER reaches the threshold RBER 702 to reduce the RBER back down to the first RBER 704. As indicated by arrows $710_0$ to $710_7$, the period between touch up programming operations for memory cells increases (e.g., exponentially) with time from the initial programming of the memory cells. This might be due to electrons being de-trapped from shallow trap sites over time, thereby increasing the retention time between touch up programming operations.

Arrows $720_0$ to $720_3$ indicate a changing RBER for first a QLC block of memory cells starting immediately after programming the QLC block of memory cells and then for a PLC block of memory cells after merging the bits stored in a SLC block of memory cells with the bits stored in the QLC block of memory cells. Arrow $720_0$ indicates an increasing RBER over time for a QLC block of memory cells. Arrow $720_1$ indicates a touch up programming operation on the QLC block of memory cells once the RBER reaches the threshold RBER 702. After the touch up programming operation or simultaneously with the touch up programming operation, the bits stored in the SLC block of memory cells are merged with the bits stored in the QLC block of memory cells to provide a PLC block of memory cells and the RBER is reduced to the first RBER 704. Arrow $720_2$ indicates an again increasing RBER over time for the PLC block of memory cells. Arrow $720_3$ indicates a touch up programming operation on the PLC block of memory cells once the RBER reaches the threshold RBER 702 to reduce the RBER back down to the first RBER 704.

Thus, as indicated by chart 700, the first touch up programming operation for the QLC block of memory cells to be merged with the SLC block of memory cells to provide the PLC block of memory cells is later than the first touch up programming operation for a PLC block of memory cells that was originally programmed as a PLC block of memory cells. In the example shown in FIG. 7, three touch up programming operations $710_1$, $710_3$, and $710_5$ might be needed for the initially programmed PLC block of memory cells before the first touch up programming operation $720_1$ would be needed for the SLC block merged with the MLC block to provide the PLC block of memory cells. Accordingly, by reducing the number of touch up programming operations after the initial programming of the memory cells and by extending the time between touch up programming operations, the quality of service of the memory device may be improved. In addition, the initial RWB for the QLC block of memory cells to be merged with the SLC block of memory cells to provide the PLC block of memory cells is improved compared to a PLC block of memory cells that was originally programmed as a PLC block of memory cells.

Figure 8:
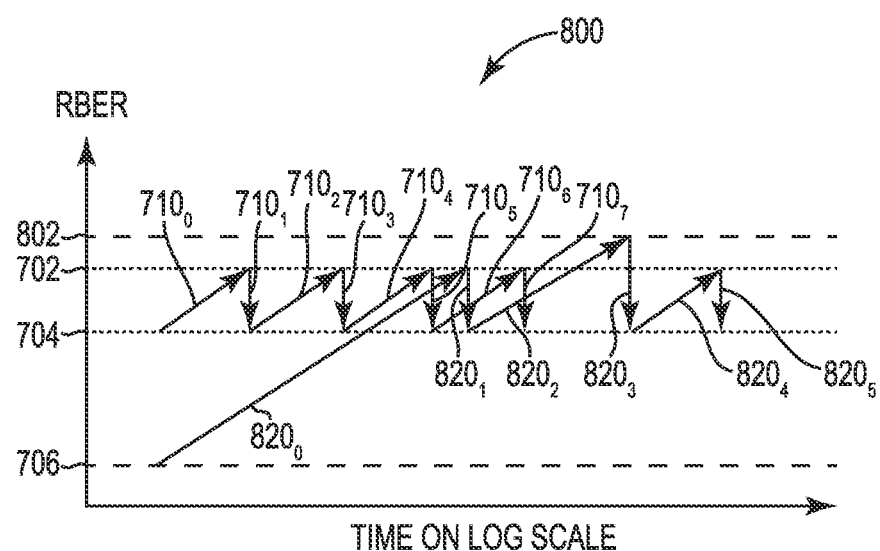
FIG. 8 is a chart depicting RBER versus time illustrating RWB and QoS improvement due to the merging of a MLC block of memory cells with a QLC block of memory cells to provide a PLC block of memory cells, according to an embodiment.

FIG. 8 is a chart depicting raw bit error rate (RBER) versus time (on log scale) illustrating RWB and Quality of Service (QoS) improvement due to the merging of one half of the bits stored in a MLC block of memory cells with the bits stored in a QLC block of memory cells to provide a PLC block of memory cells as previously described and illustrated with reference to FIG. 5B, according to an embodiment. The threshold RBER is indicated at 702, the first RBER immediately after programming a PLC block of memory cells is indicated at 704, and the second RBER immediately after programming a QLC block of memory cells is indicated at 706. Arrows $710_0$ to $710_7$ indicate a changing RBER for a PLC block of memory cells starting immediately after programming the PLC block of memory cells as previously described and illustrated with reference to FIG. 7.

Arrows $820_0$ to $820_5$ indicate a changing RBER for first a QLC block of memory cells starting immediately after programming the QLC block of memory cells and then for a PLC block of memory cells after merging one half of the bits stored in the MLC block of memory cells with the bits stored in the QLC block of memory cells. Arrow $820_0$ indicates an increasing RBER over time for the QLC block of memory cells. Arrow $820_1$ indicates a touch up programming operation on the QLC block of memory cells once the RBER reaches the threshold RBER 702. After the touch up programming operation or simultaneously with the touch up programming operation, one half of the bits stored in the MLC block of memory cells are merged with the bits stored in the QLC block of memory cells to provide a PLC block of memory cells and the RBER is reduced to the first RBER 704. Arrow $820_2$ indicates an again increasing RBER over time for the PLC block of memory cells. In this example, the MLC block of memory cells is not yet erased, thus the data stored in the MLC block of memory cells might be used for data recovery, thus enabling a higher RBER threshold 802 before a touch up programming operation is needed. Arrow 8203 indicates a touch up programming operation on the PLC block of memory cells once the RBER reaches the threshold RBER 802 to reduce the RBER back down to the first RBER 704. At this point, the MLC block of memory cells might be erased such that the RBER threshold returns to 702. Arrow $820_4$ indicates an again increasing RBER over time for the PLC block of memory cells. Arrow $820_5$ indicates a touch up programming operation on the PLC block of memory cells once the RBER reaches the threshold RBER 702 to reduce the RBER back down to the first RBER 704.

Thus, as indicated by chart 800, the first touch up programming operation for the QLC block of memory cells to be merged with one half of the bits stored in the MLC block of memory cells to provide a PLC block of memory cells is later than the first touch up programming operation for a PLC block of memory cells that was originally programmed as a PLC block of memory cells. In the example shown in FIG. 8, three touch up programming operations $710_1$, $710_3$, and $710_5$ might be needed for the initially programmed PLC block of memory cells before the first touch up programming operation $820_1$ would be needed for the MLC block merged with the QLC block to provide the PLC block of memory cells.

Accordingly, by reducing the number of touch up programming operations after the initial programming of the memory cells and by extending the time between touch up programming operations, the quality of service of the memory device may be improved. In addition, the initial RWB for the QLC block of memory cells to be merged with one half of the bits stored in the MLC block of memory cells to provide the PLC block of memory cells is improved compared to a PLC block of memory cells that was originally programmed as a PLC block of memory cells.

Figure 9A:
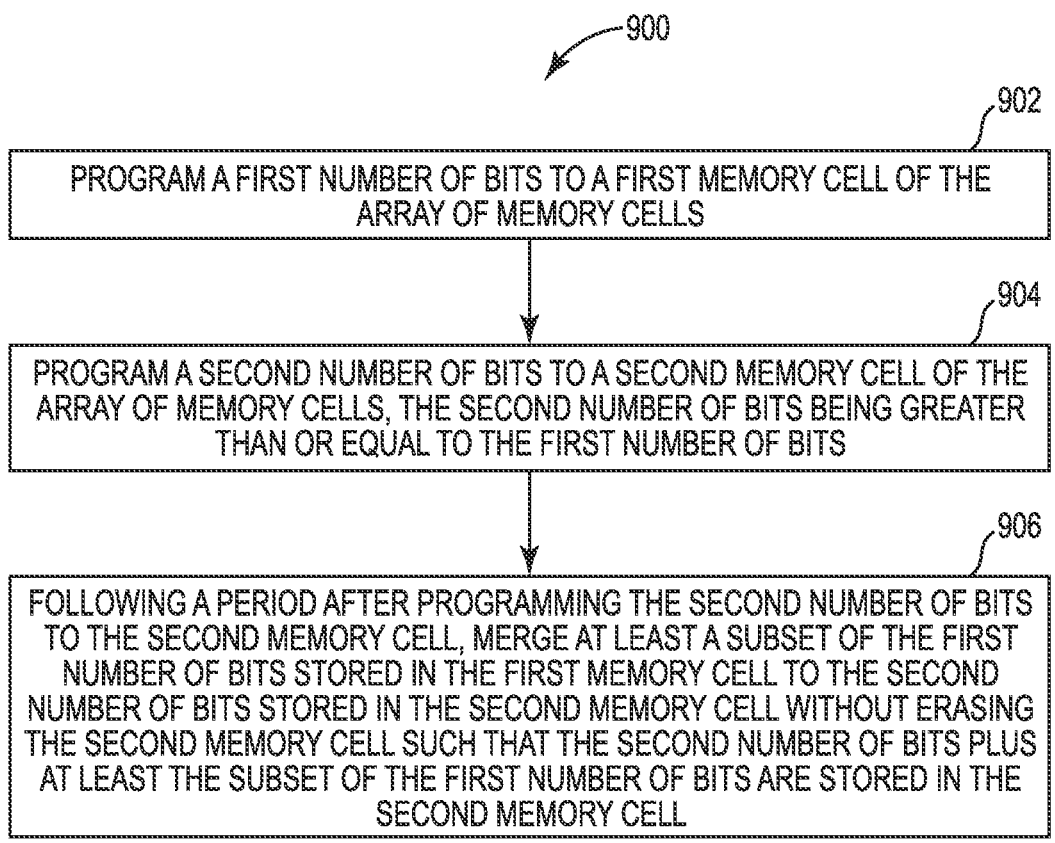
FIGS. 9A-9C are flowcharts of a method for programming an array of memory cells in accordance with an embodiment.
Figure 9B:
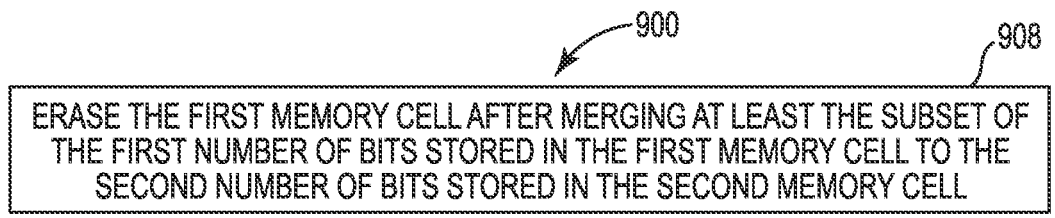
Figure 9C:
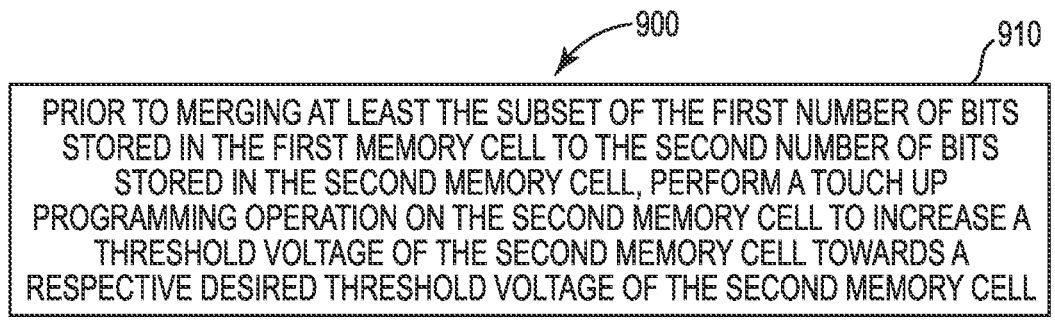

FIGS. 9A-9C are flowcharts of a method 900 for programming an array of memory cells in accordance with an embodiment. Method 900 may correspond at least in part to FIGS. 5A-5D. For example, FIGS. 9A-9C might represent a method of programming one or more memory cells, e.g., a logical page of memory cells. The method might be in the form of computer-readable instructions, e.g., stored to the instruction registers 128 of FIG. 1. Such computer-readable instructions might be executed by a controller, e.g., the control logic 116, to cause the memory device 100 to perform the method.

Method 900 might be implemented within a memory device (e.g., 100) including an array of memory cells (e.g., 104) and a controller (e.g., 116) configured to access the array of memory cells as previously described at least with reference to FIGS. 1-2C. As previously described, each memory cell of the array of memory cells is a non-volatile memory cell comprising a charge storage portion (e.g., 234) to store bits of data. In addition, a predetermined number of memory cells of the array of memory cells might be connected in series (e.g., 206), and the predetermined number of memory cells might be erased at the same time.

As illustrated in FIG. 9A at 902, the controller may program a first number of bits to a first memory cell of the array of memory cells. At 904, the controller may program a second number of bits to a second memory cell of the array of memory cells, the second number of bits being greater than or equal to the first number of bits. In one example, the first number of bits is within a range between 1 bit and 3 bits, and the second number of bits is within a range between 1 bit and 4 bits. In other examples, the first number of bits and the second number of bits may be within other suitable ranges.

At 906, the controller may, following a period after programming the second number of bits to the second memory cell, merge at least a subset of the first number of bits stored in the first memory cell to the second number of bits stored in the second memory cell without erasing the second memory cell such that the second number of bits plus at least the subset of the first number of bits are stored in the second memory cell. In one example, the period might include a predetermined period within a range where a read operation of the second memory cell completes successfully. In other examples, the period might be a fixed period or the ECC engine 126 might monitor the second memory cell for errors and adjust the period based on detected errors. In some examples, the controller may, following the period after programming the second number of bits to the second memory cell, merge the first number of bits stored in the first memory cell to the second number of bits stored in the second memory cell without erasing the second memory cell such that the second number of bits plus the first number of bits are stored in the second memory cell.

As illustrated in FIG. 9B at 908, the controller may further erase the first memory cell after merging at least the subset of the first number of bits stored in the first memory cell to the second number of bits stored in the second memory cell. As illustrated in FIG. 9C at 910, the controller may further, prior to merging at least the subset of the first number of bits stored in the first memory cell to the second number of bits stored in the second memory cell, perform a touch up programming operation on the second memory cell to increase a threshold voltage of the second memory cell towards a respective desired threshold voltage of the second memory cell.

Figure 10A:
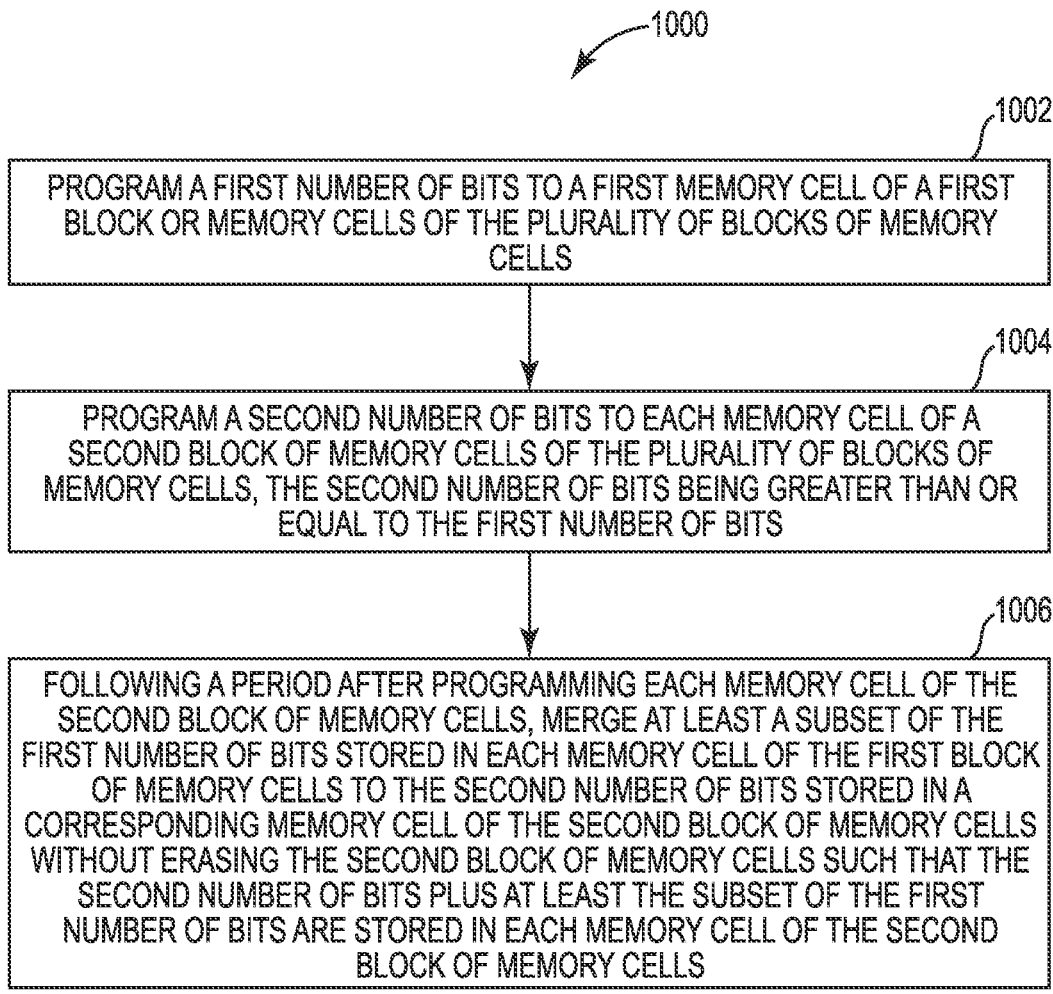
FIGS. 10A-10C are flowcharts of a method for programming an array of memory cells in accordance with another embodiment.
Figure 10B:
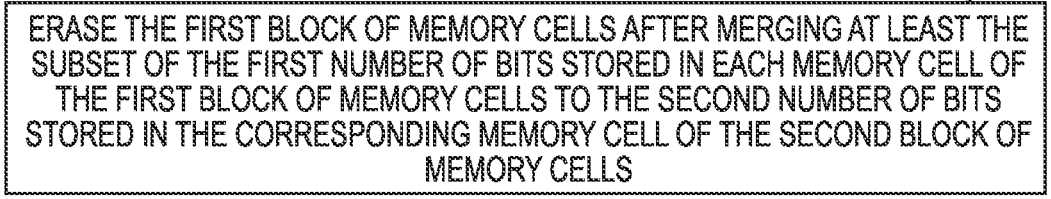
Figure 10C:
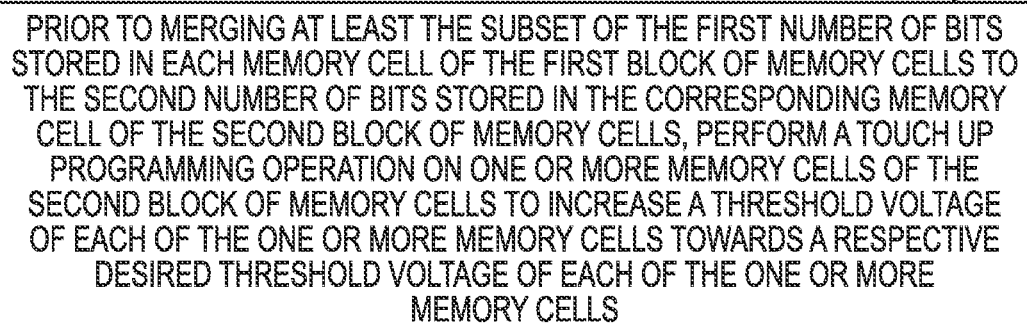

FIGS. 10A-10C are flowcharts of a method 1000 for programming an array of memory cells in accordance with another embodiment. Method 1000 may correspond at least in part to FIGS. 5A-5D. For example, FIGS. 10A-10C might represent a method of programming one or more memory cells, e.g., a block of memory cells. The method might be in the form of computer-readable instructions, e.g., stored to the instruction registers 128 of FIG. 1. Such computer-readable instructions might be executed by a controller, e.g., the control logic 116, to cause the memory device 100 to perform the method.

Method 1000 might be implemented within a memory device (e.g., 100) including an array of memory cells (e.g., 104) comprising a plurality of blocks of memory cells (e.g., 250) and a controller (e.g., 116) configured to access the plurality of blocks of memory cells as previously described at least with reference to FIGS. 1-2C. As previously described, each memory cell of the array of memory cells is a non-volatile memory cell comprising a charge storage portion (e.g., 234) to store bits of data. In addition, a predetermined number of memory cells of the array of memory cells might be connected in series (e.g., 206), and the predetermined number of memory cells might be erased at the same time.

As illustrated in FIG. 10A at 1002, the controller may program a first number of bits to each memory cell of a first block of memory cells of the plurality of blocks of memory cells. At 1004, the controller may program a second number of bits to each memory cell of a second block of memory cells of the plurality of blocks of memory cells, the second number of bits being greater than or equal to the first number of bits. In one example, the first number of bits is within a range between 1 bit and 3 bits, and the second number of bits is within a range between 1 bit and 4 bits. In other examples, the first number of bits and the second number of bits may be within other suitable ranges.

At 1006, the controller may, following a period after programming each memory cell of the second block of memory cells, merge at least a subset of the first number of bits stored in each memory cell of the first block of memory cells to the second number of bits stored in a corresponding memory cell of the second block of memory cells without erasing the second block of memory cells such that the second number of bits plus at least the subset of the first number of bits are stored in each memory cell of the second block of memory cells. In one example, the period comprises a predetermined period within a range where a read operation of the second block of memory cells completes successfully. In other examples, the period might be a fixed period or the ECC engine 126 might monitor the second block of memory cells for errors and adjust the period based on detected errors. In some examples, the controller may, following the period after programming the second number of bits to each memory cell of the second block of memory cells, merge the first number of bits stored in each memory cell of the first block of memory cells to the second number of bits stored in a corresponding memory cell of the second block of memory cells without erasing the second block of memory cells such that the second number of bits plus the first number of bits are stored in each memory cell of the second block of memory cells.

As illustrated in FIG. 10B at 1008, the controller may further erase the first block of memory cells after merging at least the subset of the first number of bits stored in each memory cell of the first block of memory cells to the second number of bits stored in the corresponding memory cell of the second block of memory cells. As illustrated in FIG. 10C at 1010, the controller may further, prior to merging at least the subset of the first number of bits stored in each memory cell of the first block of memory cells to the second number of bits stored in the corresponding memory cell of the second block of memory cells, perform a touch up programming operation on one or more memory cells of the second block of memory cells to increase a threshold voltage of each of the one or more memory cells towards a respective desired threshold voltage of each of the one or more memory cells. In some examples, the ECC engine 126 may monitor the second block of memory cells and instruct the controller to perform the touch up programming operation on the one or more memory cells of the second block of memory cells in response to the second block of memory cells comprising a raw bit error rate greater than or equal to a threshold raw bit error rate.

In one example of method 1000 corresponding to FIG. 5A, the controller may program a first block of memory cells of the plurality of blocks of memory cells as a SLC block. The controller may program a second block of memory cells of the plurality of blocks of memory cells as a QLC block. The controller may, following a period after programming the second block of memory cells, merge the first block of memory cells to the second block of memory cells without erasing the second block of memory cells such that the second block of memory cells is programmed as a PLC block. In one example, the controller may further erase the first block of memory cells after merging the first block of memory cells to the second block of memory cells. The controller may further, prior to merging the first block of memory cells to the second block of memory cells, perform a touch up programming operation on one or more memory cells of the second block of memory cells to increase a threshold voltage of each of the one or more memory cells towards a respective desired threshold voltage of each of the one or more memory cells.

In another example of method 1000 corresponding to FIG. 5B, the controller may program a first block of memory cells of the plurality of blocks of memory cells as a MLC block. The controller may program a second block of memory cells of the plurality of blocks of memory cells as a QLC block. The controller may, following a period after programming the second block of memory cells, merge one half of the first block of memory cells (e.g., one bit of each memory cell) to the second block of memory cells without erasing the second block of memory cells such that the second block of memory cells is programmed as a PLC block. In one example, the controller may further erase the first block of memory cells after merging the first block of memory cells to the second block of memory cells. The controller may further, prior to merging the first block of memory cells to the second block of memory cells, perform a touch up programming operation on one or more memory cells of the second block of memory cells to increase a threshold voltage of each of the one or more memory cells towards a respective desired threshold voltage of each of the one or more memory cells.

In another example of method 1000 corresponding to FIG. 5C, the controller may program a first block of memory cells of the plurality of blocks of memory cells as a MLC block. The controller may program a second block of memory cells of the plurality of blocks of memory cells as a TLC block. The controller may following a period after programming the second block of memory cells, merge the first block of memory cells to the second block of memory cells without erasing the second block of memory cells such that the second block of memory cells is programmed as a PLC block. In one example, the controller may further erase the first block of memory cells after merging the first block of memory cells to the second block of memory cells. The controller may further, prior to merging the first block of memory cells to the second block of memory cells, perform a touch up programming operation on one or more memory cells of the second block of memory cells to increase a threshold voltage of each of the one or more memory cells towards a respective desired threshold voltage of each of the one or more memory cells.

In another example of method 1000 corresponding to FIG. 5D, the controller may program a first block of memory cells of the plurality of blocks of memory cells as a first TLC block. The controller may program a second block of memory cells of the plurality of blocks of memory cells as a second TLC block. The controller may, following a period after programming the second block of memory cells, merge two-thirds of the first block of memory cells (e.g., two bits of each memory cell) to the second block of memory cells without erasing the second block of memory cells such that the second block of memory cells is programmed as a PLC block. In one example, the controller may further erase the first block of memory cells after merging the first block of memory cells to the second block of memory cells. The controller may further, prior to merging the first block of memory cells to the second block of memory cells, perform a touch up programming operation on one or more memory cells of the second block of memory cells to increase a threshold voltage of each of the one or more memory cells towards a respective desired threshold voltage of each of the one or more memory cells.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the embodiments will be apparent to those of ordinary skill in the art. Accordingly, this application is intended to cover any adaptations or variations of the embodiments.

What is claimed is:
1. A memory device comprising:
an array of memory cells comprising a plurality of blocks of memory cells; and
a controller configured to access the plurality of blocks of memory cells,
wherein the controller is further configured to:
program a first block of memory cells of the plurality of blocks of memory cells as a single-level cell (SLC) block;
program a second block of memory cells of the plurality of blocks of memory cells as a quad-level cell (QLC) block;
following a period after programming the second block of memory cells, merge the first block of memory cells to the second block of memory cells without erasing the second block of memory cells such that the second block of memory cells is programmed as a penta-level cell (PLC) block;
prior to merging the first block of memory cells to the second block of memory cells, perform a touch up programming operation on one or more memory cells of the second block of memory cells to increase a threshold voltage of each of the one or more memory cells towards a respective desired threshold voltage of each of the one or more memory cells, and
an error correction code (ECC) engine configured to monitor the second block of memory cells and instruct the controller to perform the touch up programming operation on the one or more memory cells of the second block of memory cells in response to the second block of memory cells comprising a raw bit error rate greater than or equal to a threshold raw bit error rate.

2. The memory device of claim 1, wherein the controller is further configured to erase the first block of memory cells after merging the first block of memory cells to the second block of memory cells.

3. The memory device of claim 1, wherein the array of memory cells comprises an array of NAND memory cells.

4. A memory device comprising:
an array of memory cells comprising a plurality of blocks of memory cells; and
a controller configured to access the plurality of blocks of memory cells,
wherein the controller is further configured to:
program a first block of memory cells of the plurality of blocks of memory cells as a multi-level cell (MLC) block;
program a second block of memory cells of the plurality of blocks of memory cells as a triple-level cell (TLC) block; and
following a period after programming the second block of memory cells, merge the first block of memory cells to the second block of memory cells without erasing the second block of memory cells such that the second block of memory cells is programmed as a penta-level cell (PLC) block; and
prior to merging the first block of memory cells to the second block of memory cells, perform a touch up programming operation on one or more memory cells of the second block of memory cells to increase a threshold voltage of each of the one or more memory cells towards a respective desired threshold voltage of each of the one ore more memory cells, and
an error correction code (ECC) engine configured to monitor the second block of memory cells an instruct the controller to perform the touch up programming operation on the one or more memory cells of the second block of memory cells in response to the second block of memory cells comprising a raw bit error rate greater than or equal to a threshold raw bit error rate.

5. The memory device of claim 4, wherein the controller is further configured to erase the first block of memory cells after merging the first block of memory cells to the second block of memory cells.

6. The memory device of claim 4, wherein the array of memory cells comprises an array of NAND memory cells.

7. A memory device comprising:
an array of memory cells comprising a plurality of blocks of memory cells; and
a controller configured to access the plurality of blocks of memory cells,
wherein the controller is further configured to:
program a first number of bits to each memory cell of a first block of memory cells of the plurality of blocks of memory cells;
program a second number of bits to each memory cell of a second block of memory cells of the plurality of blocks of memory cells, the second number of bits being greater than or equal to the first number of bits;
following a period after programming each memory cell of the second block of memory cells, merge at least a subset of the first number of bits stored in each memory cell of the first block of memory cells to the second number of bits stored in a corresponding memory cell of the second block of memory cells without erasing the second block of memory cells such that the second number of bits plus at least the subset of the first number of bits are stored in each memory cell of the second block of memory cells; and
prior to merging at least the subset of the first number of bits stored in each memory cell of the first block of memory cells to the second number of bits stored in the corresponding memory cell of the second block of memory cells, perform a touch up programming operation on one or more memory cells of the second block of memory cells to increase a threshold voltage of each of the one or more memory cells towards a respective desired threshold voltage of each of the one or more memory cells, and
an error correction code (ECC) engine configured to monitor the second block of memory cells and instruct the controller to perform the touch up programming operation on the one or more memory cells of the second block of memory cells in response to the second block of memory cells comprising a raw bit error rate greater than or equal to a threshold raw bit error rate.

8. The memory device of claim 7, wherein each memory cell of the array of memory cells is a non-volatile memory cell comprising a charge storage portion to store bits of data.

9. The memory device of claim 8, wherein a predetermined number of memory cells of the array of memory cells are connected in series and the predetermined number of memory cells are erased at the same time.

10. The memory device of claim 7, wherein the controller is further configured to, following the period after programming the second number of bits to each memory cell of the second block of memory cells, merge the first number of bits stored in each memory cell of the first block of memory cells to the second number of bits stored in a corresponding memory cell of the second block of memory cells without erasing the second block of memory cells such that the second number of bits plus the first number of bits are stored in each memory cell of the second block of memory cells.

11. The memory device of claim 7, wherein the controller is further configured to erase the first block of memory cells after merging at least the subset of the first number of bits stored in each memory cell of the first block of memory cells to the second number of bits stored in the corresponding memory cell of the second block of memory cells.

12. The memory device of claim 7, wherein the period comprises a predetermined period within a range where a read operation of the second block of memory cells completes successfully.

13. The memory device of claim 7, wherein the first number of bits is within a range between 1 bit and 3 bits, and the second number of bits is within a range between 1 bit and 4 bits.

14. A memory device comprising:
an array of memory cells; and
a controller configured to access the array of memory cells,
wherein the controller is further configured to:
program a first number of bits to a first memory cell of the array of memory cells;
program a second number of bits to a second memory cell of the array of memory cells, the second number of bits being greater than or equal to the first number of bits;
following a period after programming the second number of bits to the second memory cell, merge at least a subset of the first number of bits stored in the first memory cell to the second number of bits stored in the second memory cell without erasing the second memory cell such that the second number of bits plus at least the subset of the first number of bits are stored in the second memory cell; and prior to merging at least the subset of the first number of bits stored in the first memory cell to the second number of bits stored in the second memory cell, perform a touch up programming operation on the second memory cell to increase a threshold voltage of the second memory cell towards a respective desired threshold voltage of the second memory cell, and an error correction code (ECC) engine configured to monitor the second memory cell and instruct the controller to perform the touch up programming operation on the second memory cell in response to the threshold voltage of the second memory cell having a reduced threshold voltage less than respective desired threshold voltage.

15. The memory device of claim 14, wherein each memory cell of the array of memory cells is a non-volatile memory cell comprising a charge storage portion to store bits of data.

16. The memory device of claim 15, wherein a predetermined number of memory cells of the array of memory cells are connected in series and the predetermined number of memory cells are erased at the same time.

17. The memory device of claim 14, wherein the controller is further configured to, following the period after programming the second number of bits to the second memory cell, merge the first number of bits stored in the first memory cell to the second number of bits stored in the second memory cell without erasing the second memory cell such that the second number of bits plus the first number of bits are stored in the second memory cell.

18. The memory device of claim 14, wherein the controller is further configured to erase the first memory cell after merging at least the subset of the first number of bits stored in the first memory cell to the second number of bits stored in the second memory cell.

19. The memory device of claim 14, wherein the period comprises a predetermined period within a range where a read operation of the second memory cell completes successfully.

20. The memory device of claim 14, wherein the first number of bits is within a range between 1 bit and 3 bits, and the second number of bits is within a range between 1 bit and 4 bits.

* * * * *